United States Patent
Ishida et al.

(10) Patent No.: US 7,007,112 B2
(45) Date of Patent: *Feb. 28, 2006

(54) DATA TRANSFER CONTROL DEVICE, ELECTRONIC EQUIPMENT, AND DATA TRANSFER CONTROL METHOD

(75) Inventors: Takuya Ishida, Sapporo (JP); Yoshiyuki Kamihara, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 439 days.

This patent is subject to a terminal disclaimer.

(21) Appl. No.: 10/140,829

(22) Filed: May 9, 2002

(65) Prior Publication Data

US 2002/0169905 A1 Nov. 14, 2002

(30) Foreign Application Priority Data

May 14, 2001 (JP) .............................. 2001-143430

(51) Int. Cl.
*G06F 3/00* (2006.01)

(52) U.S. Cl. ..................................................... 710/52
(58) Field of Classification Search .............. 710/29, 710/33, 52; 711/100, 169, 170, 173
See application file for complete search history.

(56) References Cited

U.S. PATENT DOCUMENTS

| | | | | |
|---|---|---|---|---|
| 5,732,223 A | * | 3/1998 | Moore et al. .................. 710/52 |
| 6,065,087 A | * | 5/2000 | Keaveny et al. ............. 710/315 |
| 6,185,641 B1 | | 2/2001 | Dunnihoo |
| 6,389,495 B1 | * | 5/2002 | Larky et al. .................... 710/8 |
| 6,618,788 B1 | * | 9/2003 | Jacobs ........................ 710/315 |
| 6,636,908 B1 | * | 10/2003 | Winokur et al. .............. 710/29 |
| 6,687,763 B1 | * | 2/2004 | Kimura et al. ................. 710/5 |
| 6,775,702 B1 | * | 8/2004 | Oeda et al. .................. 709/226 |
| 6,779,061 B1 | * | 8/2004 | Swindle et al. ............... 710/71 |

FOREIGN PATENT DOCUMENTS

| | | |
|---|---|---|
| DE | 199 00 331 A1 | 7/1999 |
| DE | 199 00 345 A1 | 7/1999 |
| EP | 0 893 755 A2 | 1/1999 |
| JP | A 11-004279 | 1/1999 |
| JP | A 2001-36588 | 2/2001 |

OTHER PUBLICATIONS

U.S. Appl. No. 10/133,751, filed Apr. 29, 2002, Yoshiyuki et al.

(Continued)

*Primary Examiner*—A. Elamin
*Assistant Examiner*—Eric Chang
(74) *Attorney, Agent, or Firm*—Oliff & Berridge, PLC

(57) ABSTRACT

A buffer is provided which includes an EP2 area (a data storage area set to FIFO) and a CSW area (a randomly accessible status storage area), when data and a CSW are allocated as information to be transferred through one end point EP2. When a phase has switched from a USB data phase (data transport) to a status phase (status transport), the information read area is switched from the EP2 area to the CSW area, and IN data to be transferred from the end point EP2 to a host is read from the CSW area. A CSW0 area for success status and a CSW1 area for non-success status are provided, and a status block packet in which is set either success or non-success default information is previously written therein.

6 Claims, 24 Drawing Sheets

OTHER PUBLICATIONS

U.S. Appl. No. 10/140,834, filed May 9. 2002, Ishida et al. "Universal Serial Bus Mass Storage Class Bulk-Only Transport", Revision 1.0, Sep. 31, 1999.

"Universal Serial Bus Mass Storage Class Specification Overview", Revision 1.1, Jun. 28, 2000.

Universal Serial Bus Specification, Revision 1.1, Chapter 8, Protocol Layer, pp. 155-174, Chapter 9, USB Device Framework, p. 175, Sep. 23, 1999.

* cited by examiner

FIG. 2A  CBI

| | |
|---|---|
| EP0 (CONTROL) | CONTROL, COMMAND |
| EP1 (BULK-OUT) | OUT DATA |
| EP2 (BULK-IN) | IN DATA |
| EP3 (INTERRUPT) | INTERRUPT IN |

FIG. 2B  Bulk-Only

| | |
|---|---|
| EP0 (CONTROL) | CONTROL |
| EP1 (BULK-OUT) | COMMAND (CBW), OUT DATA    (A1, A2) |
| EP2 (BULK-IN) | STATUS (CSW), IN DATA    (A3, A4) |

FIG. 3

| BIT<br>BYTE | 7 | 6 | 5 | 4 | 3 | 2 | 1 | 0 |
|---|---|---|---|---|---|---|---|---|
| 0~3 | dCBWSignature ||||||||
| 4~7 | dCBWTag ||||||||
| 8~11 | dCBWDataTransferLength ||||||||
| 12 | bmCBWFlags ||||||||
| 13 | RESERVED(0) |||| bCBWLUN ||||
| 14 | RESERVED(0) ||| bCBWCBLength |||||
| 15~30 | CBWCB ||||||||

CBW

FIG. 4

| BIT<br>BYTE | 7 | 6 | 5 | 4 | 3 | 2 | 1 | 0 |
|---|---|---|---|---|---|---|---|---|
| 0~3 | \multicolumn{8}{c|}{dCSWSignature} | | | | | | | |
| 4~7 | dCSWTag | | | | | | | |
| 8~11 | dCSWDataResidue | | | | | | | |
| 12 | bCSWStatus | | | | | | | |

CSW

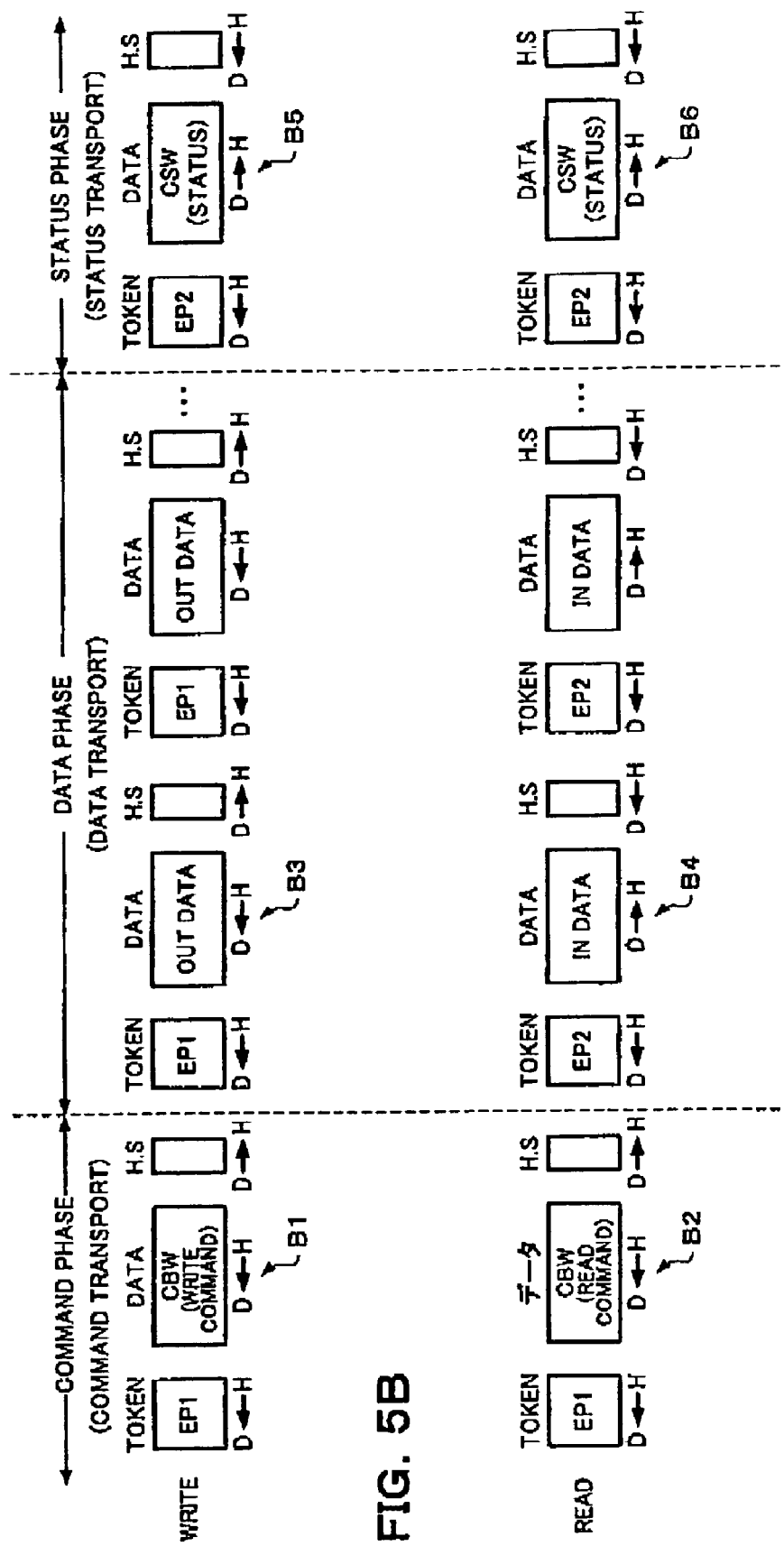

FIG. 8A SUCCESSFUL TRANSFER
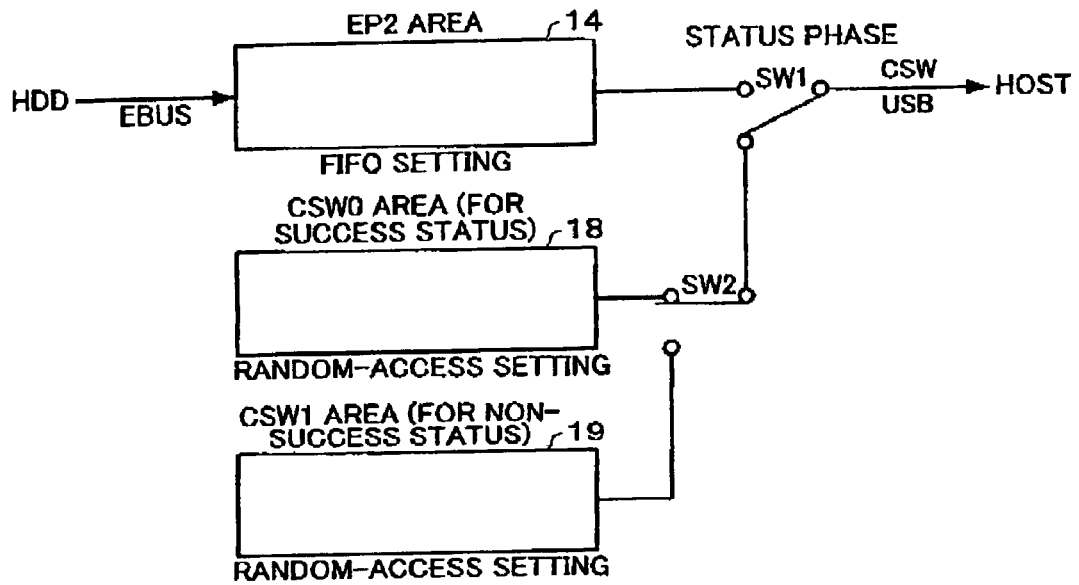
FIG. 8B UNSUCCESSFUL TRANSFER
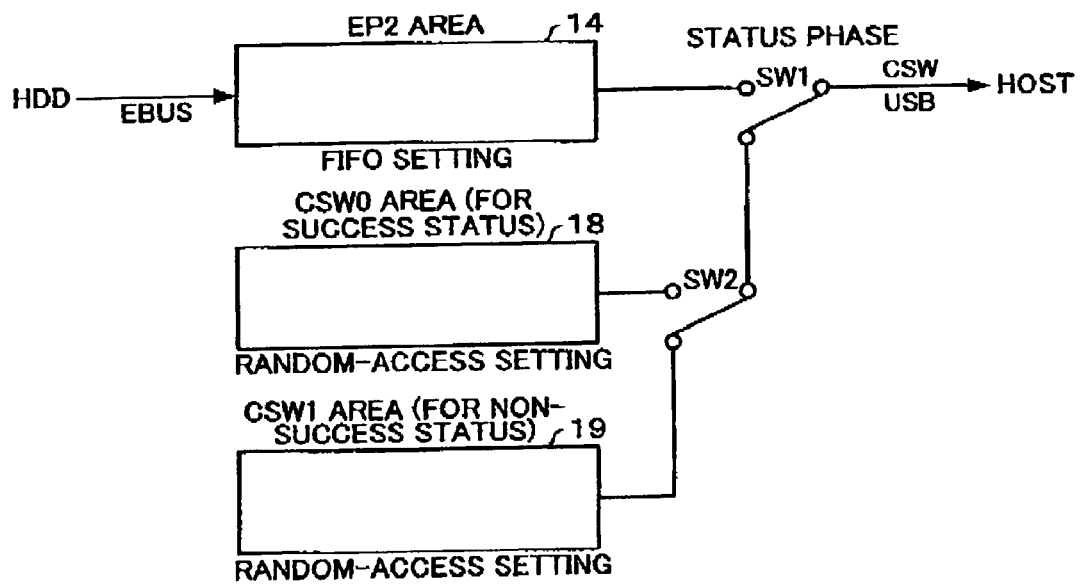

DEFCSW0 (FOR SUCCESS STATUS)

DEFCSW1 (FOR NON-SUCCESS STATUS)

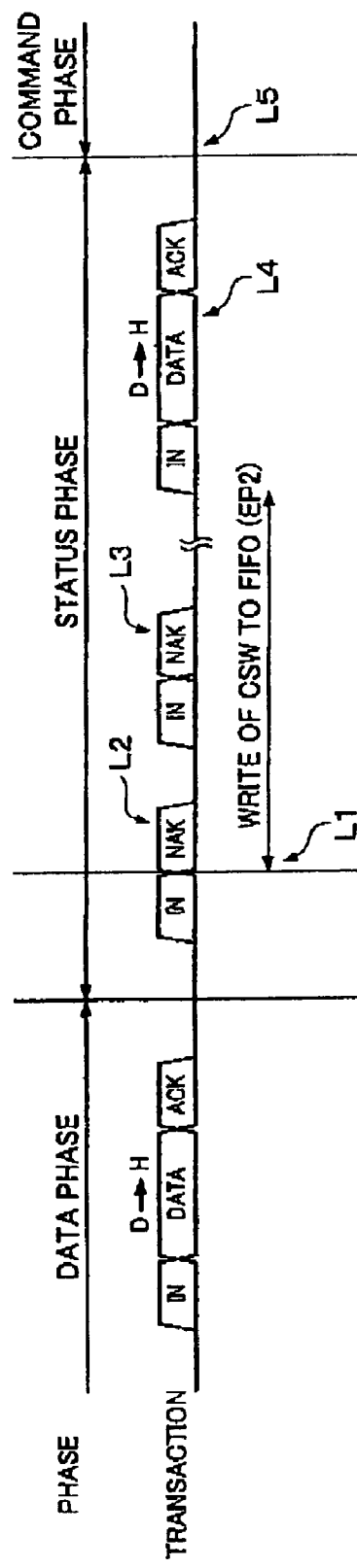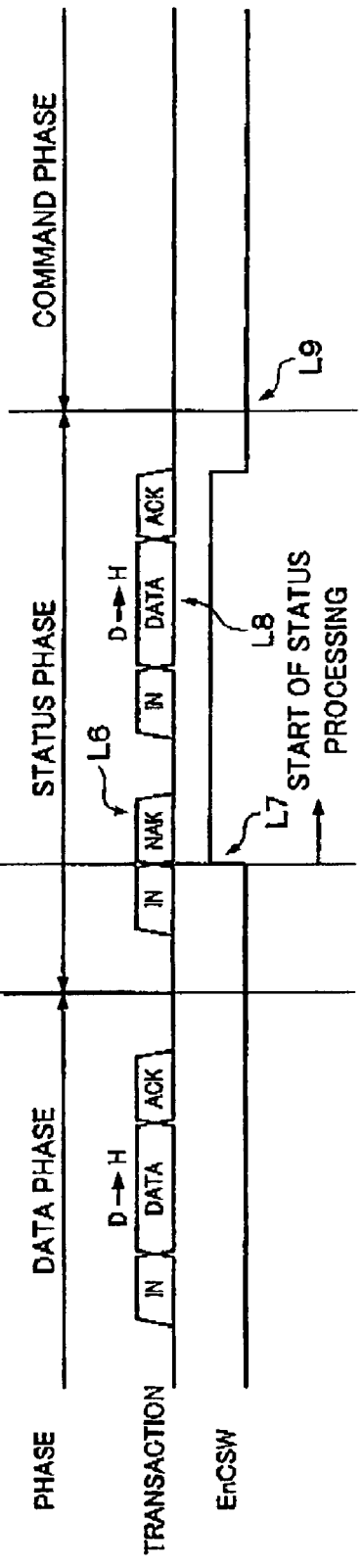
FIG. 21A COMPARATIVE EXAMPLE
FIG. 21B THIS EMBODIMENT

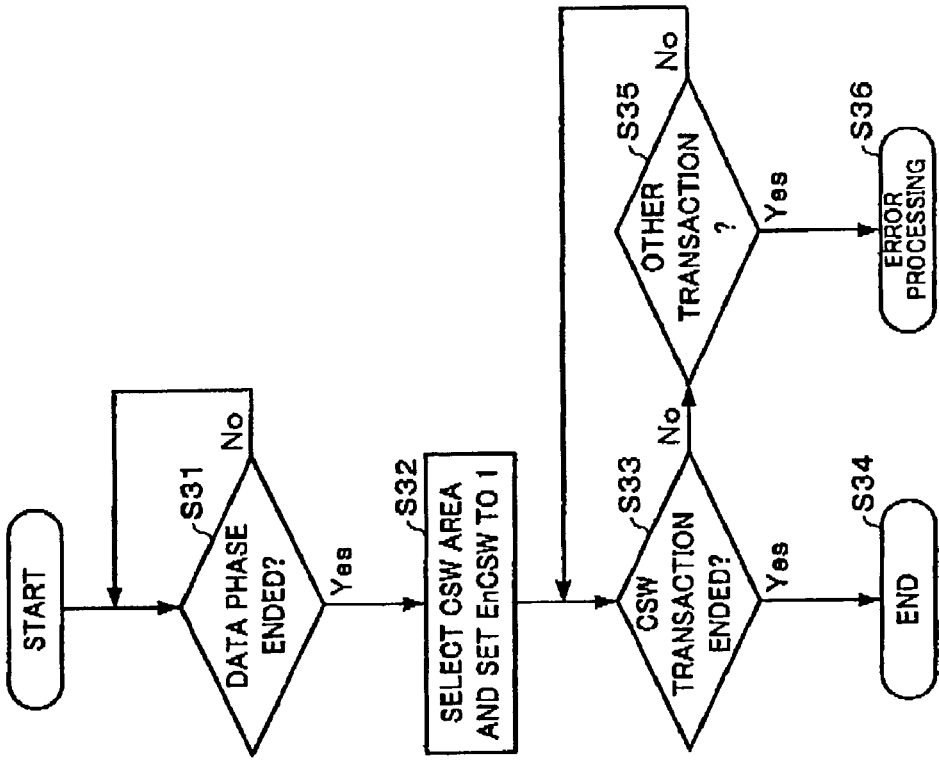
FIG. 22B THIS EMBODIMENT
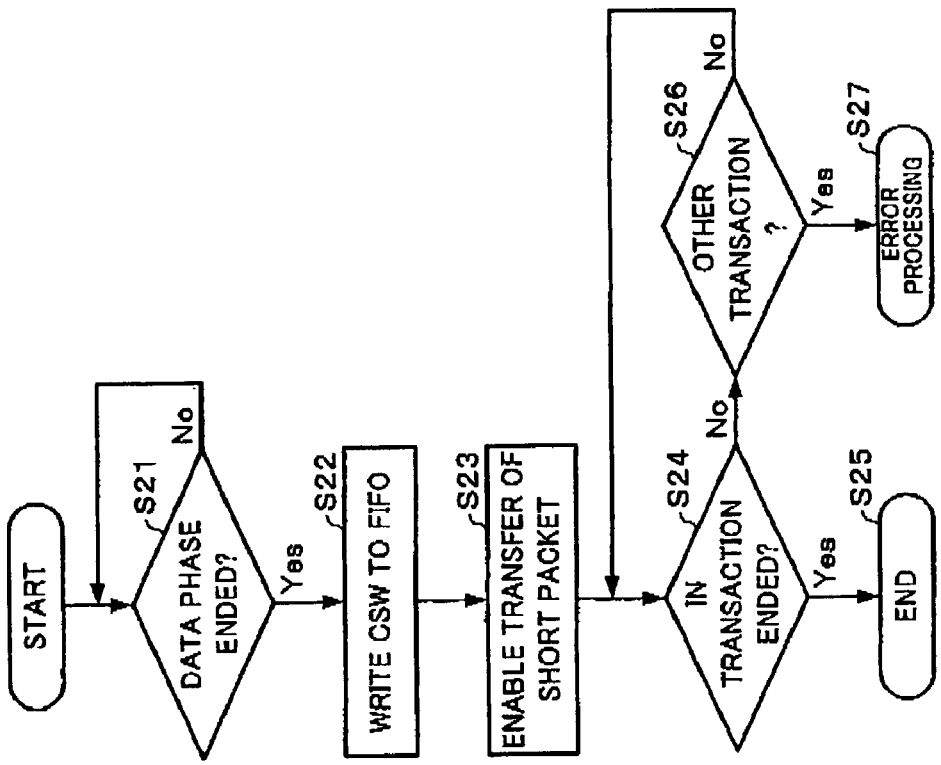
FIG. 22A COMPARATIVE EXAMPLE

DATA TRANSFER CONTROL DEVICE, ELECTRONIC EQUIPMENT, AND DATA TRANSFER CONTROL METHOD

Japanese Patent Application No. 2001-143430, filed on May 14, 2001, is hereby incorporated by reference in its entirety.

BACKGROUND

The present invention relates to a data transfer control device, electronic equipment, and a data transfer control method.

The universal serial bus (USB) standard has recently attracted attention as an interface standard for connections between personal computers and peripheral equipment (generally speaking: electronic equipment). This USB standard has the advantage of enabling the use of connectors of the same standard to connect peripheral equipment such as a mouse, keyboard, and printer, which are connected by connectors of different standards in the prior art, and of making it possible to implement plug-and-play and hot-plug features.

In comparison with the IEEE 1394 standard, which is also attracting notice as a standard for the same serial bus interface, this USB standard has a problem in that the transfer speed thereof is slower.

In this case, attention is focused on the decision to use the USB 2.0 standard which can implement a data transfer speed of 480 Mbps (in HS mode), far faster than that of the previous USB 1.1 standard, while maintaining backward compatibility with USB 1.1.

With USB 2.0, data transfer is performed at 480 Mbps in high-speed (HS) mode. It therefore has the advantage of enabling its use as an interface for a storage device such as a hard disk drive or optical disk drive, which requires fast transfer speeds.

However, this means that the data transfer control device connected to the USB bus has to process data that is transferred at the high speed of 480 Mbps. If the processing speed of the data transfer control device or the firmware (CPU) that controls the data transfer control device is slow, it is not possible to ensure the effective transfer speed and a problem occurs in that the bus zone could be lost.

SUMMARY

According to one embodiment of the invention, there is provided a data transfer control device for data transfer through a bus, comprising: a buffer which includes a first storage area for a first information and a second storage area for a second information, the first and second storage areas being provided for one end point, when a plurality of types of informations including the first and second informations have been allocated as informations to be transferred through the one end point; and a buffer management circuit which reads information to be transferred from the end point to a host from the first storage area for the first information during a first phase in which the first information is transferred through the bus, and reads information to be transferred from the end point to the host from the second storage area for the second information during a second phase in which the second information is transferred through the bus.

According to another embodiment of the invention, there is provided a data transfer control device for data transfer through a bus, comprising: a buffer which includes a data storage area for data and a status storage area for a status block, which are provided for one end point, when a data packet and a status block packet have been allocated as informations to be transferred through the one end point; and a buffer management circuit which switches an information read area from the data storage area for data to the status storage area for the status block, and reads a status block packet to be transferred from the end point to a host from the status storage area, when a phase switches from a data phase during which a data packet is transferred through the bus to a status phase during which a status block packet is transferred through the bus.

BRIEF DESCRIPTION OF THE SEVERAL VIEWS OF THE DRAWING

FIGS. 2A and 2B are illustrative of the CBI specification and the Bulk-Only specification;

FIG. 3 shows the CBW format;

FIG. 4 shows the CSW format;

FIGS. 5A and 5B are illustrative of the writing and reading of data during Bulk-Only;

FIGS. 8A and 8B are illustrative of a method of providing a success status CSW0 area and a non-success status CSW1 area;

FIGS. 21A and 21B are timing waveform charts of the comparative example and this embodiment;

FIGS. 22A and 22B are flowcharts of the firmware processing of the comparative example and this embodiment.

DETAILED DESCRIPTION

Figure 1A:
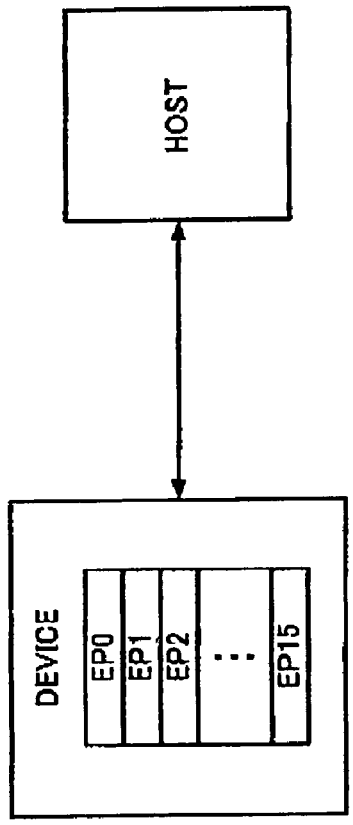
FIGS. 1A, 1B, 1C, and 1D are illustrative of end points and transaction configurations under USB.

Embodiments of the present invention are described below.

Note that the embodiments described below do not limit the scope of the invention defined by the claims laid out herein. Similarly, the overall configuration of the embodiments below should not be taken as limiting the subject matter defined by the claims herein.

One embodiment of the present invention relates to a data transfer control device for data transfer through a bus, comprising:

a buffer which includes a first storage area for a first information and a second storage area for a second information, the first and second storage areas being provided for one end point, when a plurality of types of informations including the first and second informations have been allocated as informations to be transferred through the one end point; and a buffer management circuit which reads information to be transferred from the end point to a host from the first storage area for the first information during a first phase in which the first information is transferred through the bus, and reads information to be transferred from the end point to the host from the second storage area for the second information during a second phase in which the second information is transferred through the bus.

With this embodiment, a first storage area for the first information that is allocated to given end point and a second storage area for the second information that is allocated to the same end point are provided in a buffer. During a first phase (first transport), information to be transferred from the end point to the host is read from the first storage area, and during a second phase (second transport), information to be transferred from the end point to the host is read from the second storage area.

This makes it possible to perform processing on the second information in the Second storage area while the first information is being read from the first storage area, even when several types of information have been allocated to one end point. It is therefore possible to complete the processing on the second information quickly during the second phase, after a phase has switched from the first phase to the second phase, thus enabling an increase in the effective bus transfer speed.

In the data transfer control device, the first storage area for the first information may be set to be an area such that information that is input first thereto is output first therefrom; and the second storage area for the second information may be set to be a randomly accessible area.

This makes it possible to efficiently perform the processing on the second information written to the second storage area, thus enabling an increase in the effective bus transfer speed.

In the data transfer control device, the first information may be a data packet; and the second information may be a status block packet.

It should be noted, however, that the types of the first and second informations stored in the first and second storage areas in accordance with this embodiment can be set as desired.

In the data transfer control device, a status block packet may be prepared in the second storage area while a data packet is being read from the first storage area.

This makes it possible to begin the processing such as reading the second information from the second storage area quickly after a phase has switched from the first phase to the second phase, thus enabling an increase in the effective bus transfer speed.

In the data transfer control device, the second storage area may comprise a third storage area into which is written a first status block packet for success status and a fourth storage area into which is written a second status block packet for non-success status, and the first status block packet for success status may be read from the third storage area when status is success, and the second status block packet for non-success status maybe read from the fourth storage area when status is non-success.

This makes it possible to fix the information read area to the third storage area, except for when the non-success status occurs, thus reducing the processing load such as that for switching areas.

In the data transfer control device, a status block packet in which is set default information for success status may be written beforehand into the third storage area.

This makes it possible to omit the processing to update of information in portions of default information, thus reducing the processing load relating to the second information.

In the data transfer control device, tag information for linking together a status block packet and a command block packet may be updated, from among information for the status block packet in which default information is set, and the updated status block packet maybe read as the first status block packet from the third storage area.

This makes it possible further reduce the processing load concerning the second information, since it becomes necessary only to update (overwrite) the tag information.

In the data transfer control device, a read area for information to be transferred from an end point to a host may be switched from the first storage area to the second storage area, when it has been determined that a phase has switched from the first phase to the second phase.

This makes it possible to switch the information read area by simply determining that a phase has switched, enabling a reduction in the processing load on the data transfer control device.

In the data transfer control device, it may be determined that a phase has switched from the first phase to the second phase when the condition is satisfied that transfer processing for transferring the first information through a second bus and writing the information into the first storage area has completed and also that the first storage area has become empty.

This makes it possible to determine that a phase has switched with a simple circuit control and circuit configuration, thus making the data transfer control device more compact and less expensive.

Another embodiment of the present invention also relates to a data transfer control device for data transfer through a bus; comprising:

a buffer which includes a data storage area for data and a status storage area for a status block, which are provided for one end point, when a data packet and a status block packet have been allocated as informations to be transferred through the one end point; and a buffer management circuit which switches an information read area from the data storage area for data to the status storage area for the status block, and reads a status block packet to be transferred from the end point to a host from the status storage area, when a phase switches from a data phase during which a data packet is transferred through the bus to a status phase during which a status block packet is transferred through the bus.

With this embodiment, a data storage area for a data packet that is allocated to a given end point and a status storage area for a status block packet that is allocated to the same end point are provided in a buffer. When a phase has switched from the data phase (data transport) to the status phase (status transport), the read area for information to be transferred to the host is switched from the data storage area to the status storage area.

This makes it possible to perform processing relating to a status block packet while performing processing for reading a data packet from the data storage area, even when both a data packet and a status block packet have been allocated to one end point. It is therefore possible to increase the processing speed of the data transfer control device and reduce the load on the unit for processing the status block packet, thus enabling an increase in the effective bus transfer speed.

In the data transfer control device, data transfer may be in accordance with the universal serial bus (USB) standard.

It should be noted, however, that this embodiment could also be applied to standards other than USB (or standards that inherit the concept of USB).

Electronic equipment in accordance with one embodiment of the present invention comprises any of the above described data transfer control devices; and a device which performs output processing, fetch processing, or storage processing on data transferred through the data transfer control device and the bus.

Since this embodiment makes it possible to reduce the processing load on the processing unit (such as the firmware) that controls the data transfer of the data transfer control device, it enables benefits such as reductions in the cost and scale of electronic equipment. This embodiment also enables data transfer in fast transfer modes, thus increasing the speed of processing of the electronic equipment.

This embodiment is described below with reference to the accompanying figures.

1. USB 1.1 Data Transfer Method

The data transfer method in accordance with USB (USB 2.0) will first be described briefly.

USB differs from other methods such as IEEE 1394 in that a host takes the initiative. In other words, activation of a data transfer transaction is done by the host side and the greater part of control relating to data transfer is done by the host. This increases the processing load on the host, but since the personal computer (PC) that forms the host has a high-speed, high-performance CPU (processor), the processing of such a heavy load is not too much of a problem.

Since the device (target) need only respond to a request from the host under USB, the processing and configuration on the device side can be simplified. It is therefore not necessary to use a high-performance, fast CPU on the device side, such as the host, making it possible to use an inexpensive CPU (microprocessor), thereby reducing costs.

To implement this data transfer under USB, with the host taking the lead, end points (EP0 to EP15) are provided on the device side, as shown in FIG. 1A. In this case, an end point is equivalent to an entrance to a buffer (FIFO) for data transfer between the host and the device, where all of the data transfer done under USB is done through these end points.

Each of these end points can be addressed uniquely by a device address and an end point number. In other words, the host can freely perform data transmission to a desired end point or data reception from a desired end point, by specifying a device address and an end point number.

End point specification is done freely by the device side, and the host can be notified of details such as the allocation of end point numbers and the sizes of storage areas allocated to those end points, during enumeration processing.

Note that USB provides control transfer, isochronous transfer, interrupt transfer, and bulk transfer as data transfer types.

In this case, control transfer is a transfer mode for control performed through a control end point between the host and the device (target). This control transfer sends information such as configuration information for initializing the device.

Isochronous transfer is a transfer mode that is provided for transferring data where it is more important to ensure bandwidth rather than correctness, such as image data or audio data. Since this isochronous transfer ensures that a fixed quantity of data can be transferred in a fixed period, it is an effective transfer mode for applications where real-time data capabilities are important.

Interrupt transfer is a transfer mode that is provided for transferring a small quantity of data at a comparatively low transfer speed.

Bulk transfer is a transfer mode that is provided for transferring a large quantity data that occurs at irregular periods. This bulk transfer enables data transfer at spare times other than times being used by isochronous transfers or interrupt transfers, and also enables checking of the correctness of the data. It is therefore an effective transfer mode for data transfer where real-time capabilities are not important but data reliability can be ensured.

1.2 Transaction Configuration

Figure 1B:
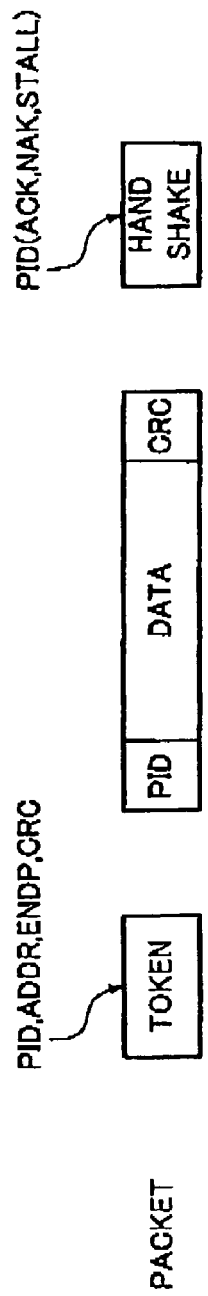

A transaction in USB bulk transfer mode is basically made up of three packets as shown in FIG. 1B: a token packet, a data packet, and a handshake packet. Note that a handshake packet is not necessary with isochronous transfer.

In this case, a token packet is a packet that is used in situations such as when the host requests a read or write with respect to an end point of the device (target). This token packet has fields such as PID (a packet ID such as OUT, IN, SOF, or SETUP), ADDR (device address), ENDP (end point number), and CRC (Cyclic Redundancy Check), by way of example.

A data packet is a packet for sending the actual data, and has PID (DATA0, DATA1), DATA (the actual data), and CRC fields.

A handshake packet is a packet used by the reception side to inform the transmitter side whether or not data reception was successful, and has a PID (ACK, NAK, or STALL) field.

Figure 1C:

With an OUT transaction (a transaction whereby the host outputs information to the device), the host first sends an OUT token packet to the device, as shown in FIG. 1C. The host then sends an OUT data packet to the device. If the device succeeds in receiving the OUT data packet, it sends an ACK handshake packet to the host.

Figure 1D:

With an IN transaction (a transaction whereby the host inputs information from the device), on the other hand, the host first sends an IN token packet to the device, as shown in FIG. 1D. On receiving the IN token packet, the device sends an IN data packet to the host. If the host succeeds in receiving the IN data packet, it sends an ACK handshake packet to the device.

Note that "D←H" in FIGS. 1C and 1D means that information is transferred from the host to the device and "D→H" means that information is transferred from the device to the host (this convention is used hereinafter in the figures and description.

1.3 Bulk-Only

USB devices are divided into a number of classes. Devices such as hard disk drives and optical disk drives belong to a class called mass storage, and there are specifications created by the vendors of electronic equipment within this mass storage class, such as control/bulk/interrupt (CBI) and Bulk-only specifications.

With the CBI specification, the device provides end points EP0, EP1, EP2, and EP3 for control, bulk-out, bulk-in, and interrupt, as shown in FIG. 2A. In this case, the end point EP0 is for the transfer of USB-layer control packets or command packets. EP1 is for the transfer of OUT data (data transferred from the host to the device), EP2 is for the transfer of IN data (data transferred from the device to the host), and EP3 is for the transfer of interrupt IN packets. Note that any of EP1 to EP15 can be allocated as bulk-out, bulk-in, and interrupt IN end points, from the device side.

With the Bulk-Only specification, on the other hand, the device provides end points EP0, EP1, and EP2 for control, bulk-out, and bulk-in, as shown in FIG. 2B. In this case, the end point EP0 is for the transfer of USB-layer control packets. EP1 is for the transfer of commands (CBW) and OUT data, and EP2 is for the transfer of statuses (CSW) and IN data packets. Note that any of EP1 to EP15 can be set to be bulk-out and bulk-in end points, from the device side.

In this case, a command block wrapper (CBW) is a packet that comprises information relating to command blocks, and has the format shown in FIG. 3. A command status wrapper (CSW) is a packet that comprises the status of a command block, and has the format shown in FIG. 4.

In FIG. 3, dCBWSignature is information for identifying that packet as a CBW, dCBWTag is a command block tag, and dCBWDataTransferLength specifies the length of data to be transferred in the data phase. The bmCBWFlags field is a flag for specifying the transfer direction or the like, dCBWLUN is a logical unit number, bCBWCBLength is the command length, and CBWCB is a command block in which an ATA/ATAPI or SCSI command is encapsulated and described.

In FIG. 4, dCSWSignature is information for identifying that packet as a CSW, dCSWTag is a status block tag, and the value of the dCBWTag of the CBW corresponding to that CSW is written therein. The CSWDataResidue field gives the difference between the length of data specified by dCBWDataTransferLength of the CBW and the length of data that the device has actually processed, and bCSWStatus is a status block.

The description now turns to the processing for writing or reading data under the Bulk-Only specification of FIG. 2B, with reference to FIGS. 5A and 5B.

When the host writes data to the device, it first performs a command phase (command transport) in which it transfers a CBW to the device, as shown in FIG. 5A. More specifically, the host transfers a token packet specifying the end point EP1 to the device, then transfers a CBW (see A1 in FIG. 2B and FIG. 3) to the end point EP1 of the device. This CBW comprises a write command. If the device returns a handshake (H.S) to the host, the command phase ends.

When the command phase (command transport) ends, the data phase (data transport) starts. In this data phase, the host first transfers a token packet specifying the end point EP1 of the device, then it transfers OUT data (see A2 in FIG. 2B) to the end point EP1 of the device. Each transaction ends when an ACK handshake is returned from the device to the host. Transactions are repeated in this manner and the data phase ends when data has been transferred up to the data length specified in dCBWDataTransferLength of the CBW (see FIG. 3).

When the data phase (data transport) ends, a status phase (status transport) starts. In this status phase, the host first transfers a token packet specifying the end point EP2 to the device. When that happens, the device transfers the CSW that is at the end point EP2 (see A3 in FIG. 2B and FIG. 4) to the host. The status phase ends when an ACK handshake is returned from the host to the device.

When the host reads data, it first transfers a token device specifying the end point EP1 to the device, as shown in FIG. 5B, then it transfers the CBW to the end point EP1 to the device. This CBW comprises a read command. If a handshake returns from the device to the host, the command phase ends.

When the command phase ends, the data phase starts. In this data phase, the host first transfers a token packet specifying the end point EP2 to the device. When that happens, the device transfers the IN data that is at the end point EP2 (see A4 in FIG. 2B) to the host, and one transaction ends. Transactions are repeated in this manner and the data phase ends when data has been transferred up to the data length specified in dCBWDataTransferLength of the CBW.

When the data phase ends, the status phase starts. The processing in this status phase is similar to that of data write processing described with reference to FIG. 5A.

2. Characteristics of This Embodiment 2.1 Area Switching

The CBI specification shown in FIG. 2A relates to a specification by which the host transfers a token to the device within a fixed period. For that reason, this has a disadvantage in that the processing load on the host and the processing load on the device that receives this token are heavy.

That is why the Bulk-Only specification of FIG. 2B is currently popular.

With this Bulk-Only specification, however, several types of information are allocated as information to be transferred through one end point. More specifically, a CBW (command) and OUT data are allocated as information to be transferred through the bulk-out end point EP1, and a CSW (status) and IN data are allocated as information to be transferred through the bulk-in end point EP2, as shown in FIG. 2B. The host and device must therefore distinguish which type of information is to be transferred through each of the end points. With the Bulk-only specification, the host and the device determine what phase is the current phase and also distinguish this information.

Since the current phase is the command phase at B1 and B2 of FIGS. 5A and 5B, by way of example, it is determined that the information to be transferred through the end point EP1 is a command (CBW). Since the current phase is the data phase at B3 and B4, it is determined that the information to be transferred through the end point EP1 is OUT data and the information to be transferred through the end point EP2 is IN data. Furthermore, since the current phase is the status phase at B5 and B6, it is determined that the information to be transferred through the end point EP2 is a status (CSW).

Since the Bulk-Only specification ensures that data transfer is such that there is matching between the phases at the host and the device, appropriate data transfer is possible, even when several types of information (CBW and OUT data or CSW and IN data) are allocated to one end point.

However, the following problem has been determined with the Bulk-Only specification.

Figure 6A:
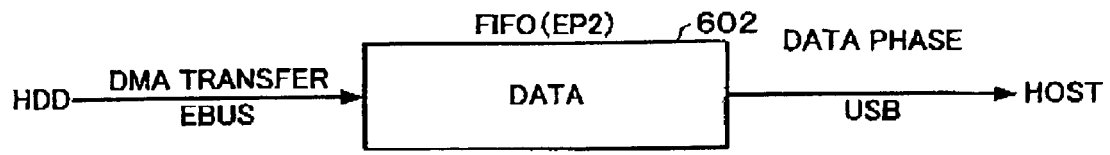
FIGS. 6A, 6B, 6C, and 6D are illustrative of a method in accordance with a comparative example.

A method in accordance with a comparative example of this embodiment is shown in FIGS. 6A to 6D, by way of example. In this comparative example, data is written from a device such as a hard disk drive HDD to a FIFO (EP2) 602 that is the entrance point to the end point EP2, during the data phase, as shown in FIG. 6A. More specifically, read data from the HDD is transferred by DNA transfer to the FIFO 602 through EBUS (a second bus, described later with reference to FIG. 12).

Figure 6B:
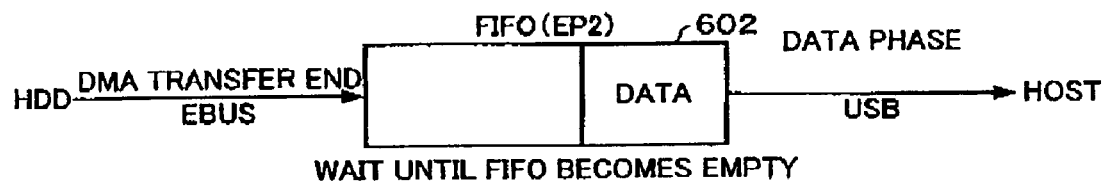

When the DMA transfer through EBUS ends, the system waits until the FIFO 602 becomes empty (until the Empty signal becomes active), as shown in FIG. 6B.

Figure 6C:
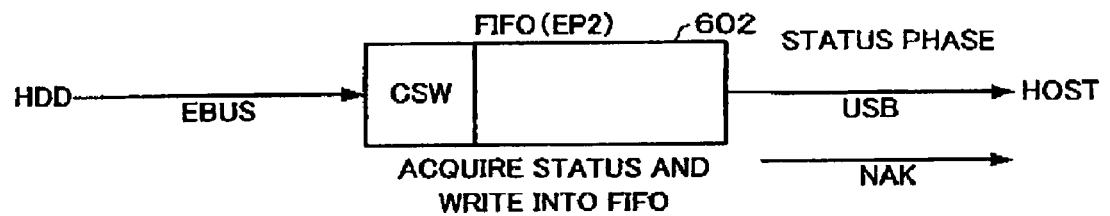

When the FIFO 602 becomes empty and a transition occurs from the data phase to the status phase, the CPU (firmware or processing unit) acquires the status of the data transfer (IDE data transfer) from the hard disk drive HDD (EBUS) side, as shown in FIG. 6C. The writing of the generated CSW (see FIG. 4) to the FIFO 602 is based on the thus-acquired status. With the comparative example in this case, it is not possible to return an IN data packet in answer to the IN token from the host until the CSW write processing done by the CPU ends, so NAK is returned.

Figure 6D:
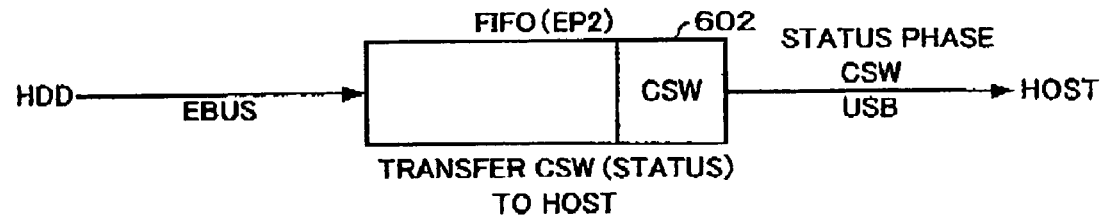

The thus-written CSW is read into the FIFO 602, which uses the first-in, first-out method, and is transferred through USB to the host, as shown in FIG. 6D.

In this manner, this comparative example has a problem in that the FIFO 602 is used in common for transferring both the data (IN data) and the CSW, so that the end of CSW write processing is delayed and thus the effective data transfer speed is deteriorated by that much.

More specifically, first of all the processing of writing the CSW to the FIFO 602 of this comparative example cannot start until the FIFO 602 has become empty, as shown in FIG. 6B. Assume by way of example that the 13-byte CSW (see FIG. 4) has been written to the FIFO 602 in a state in which 499 bytes of data remain in the FIFO 602. When that happens, the quantity of data in the FIFO 602 is 499+13=512 bytes, which is the maximum packet size, so a situation occurs in which the status CSW is transferred as data to the host.

For that reason, it is necessary in this comparative example to wait until the FIFO 602 becomes empty and a transition from the data phase to the status phase has occurred, to write the CSW into the FIFO 602. The end of CSW write processing is therefore delayed by this wait time, reducing the effective data transfer speed.

With this comparative example, the CSW cannot be written to the FIFO 602 during the data phase period, so the CSW is written after the transition to the status phase, as shown in FIG. 6C. In addition, NAK is returned in answer to IN tokens from the host, up until the end of this CSW write, and this delay further reduces the effective data transfer speed.

In this case, since the bus transfer speeds under USB 1.1 were so low, the delays in processing on the device side as shown in FIGS. 6B and 6C caused substantially no problems.

However, HS mode of USB 2.0 performs data transfer at a fast 480 Mbps. If there are delays in the processing on the device side, therefore, the high-speed transfers of USB 2.0 will be impeded thereby and thus the effective data transfer speed of the entire system will be greatly degraded.

In particular, it often happens that an inexpensive CPU that operates at a clock frequency of 20 to 50 MHz is used on the device side, from requirements of reduced cost. If the processing of FIGS. 6B and 6C is extremely time-consuming, therefore, the delays in the effective data transfer speed will be even more serious.

In order to solve such problems, this embodiment uses a method of switching between storage areas in the buffer in accordance with the switching of phase (transport).

Figure 7A:
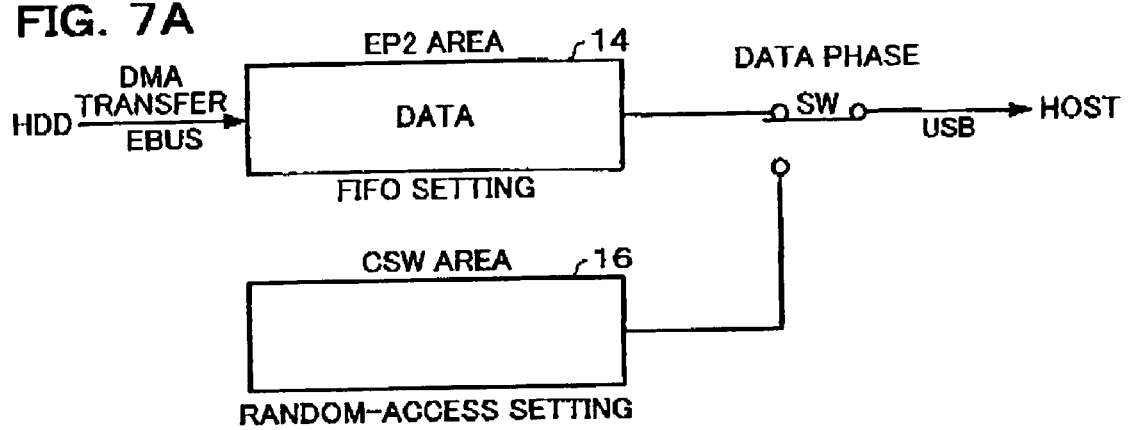
FIGS. 7A, 7B, and 7C are illustrative of a method in accordance with this embodiment.

More specifically, a buffer that is a packet storage unit in accordance with this embodiment is provided with a CSW area 16 (second storage area: status storage area) for reading the CSW (second information: status block), in addition to an EP2 area 14 (first storage area: data storage area) for reading IN data (first information), as shown in FIG. 7A.

In this case, both the EP2 area 14 and the CSW area 16 are storage areas that use the bulk-in end point EP2 as entrance point. The EP2 area 14 is set in such a manner that information that is input first thereto is output first therefrom (FIFO setting) and the CSW area 16 is set in such a manner that information therein can be randomly accessed (random access setting).

With this embodiment, a switch SW (switching unit) is turned towards the EP2 area 14 side during the data phase (first phase), as shown in FIG. 7A, so that data to be transferred to the host (data from the hard disk HDD) is read from the EP2 area 14.

Figure 7B:
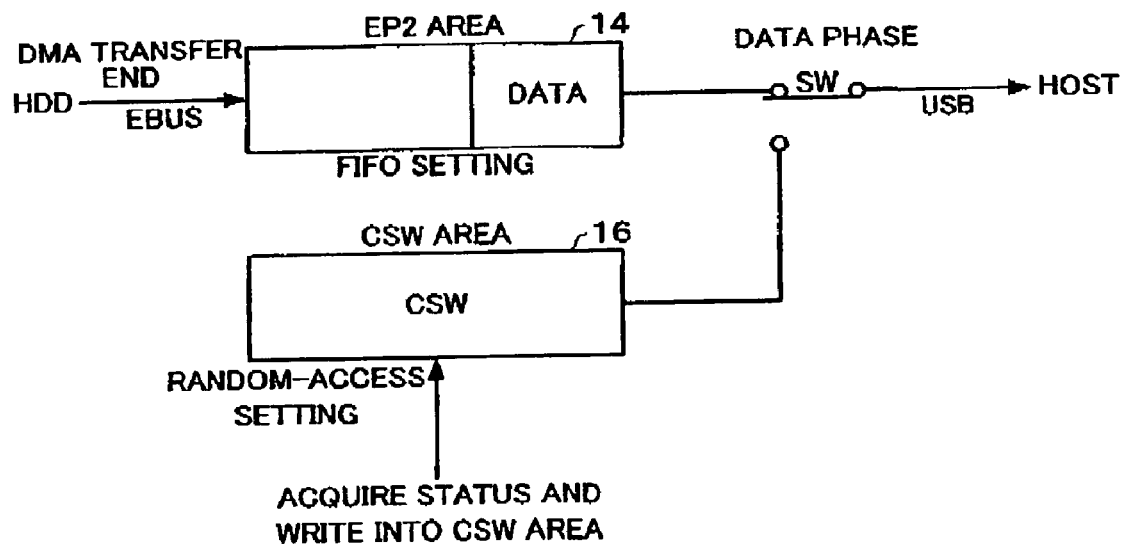

When data transfer over EBUS (the second bus) ends, the CPU (firmware or processing unit) acquires the status of the data transfer over EBUS from the hard disk drive HDD side, creates the CSW on the basis of the thus-acquired status, and writes the thus-generated CSW (see FIG. 4) into the CSW area 16, as shown in FIG. 7B, In other words, this embodiment ensures that the generation (preparation) of the CSW and the writing of the CSW begins during the period of the data phase (first phase) in which the IN data packet is being read from the EP2 area 14 (first storage area). Since the CSW area 16 is set to be randomly accessible. the CPU can write information to any address in the CSW area 16.

Figure 7C:
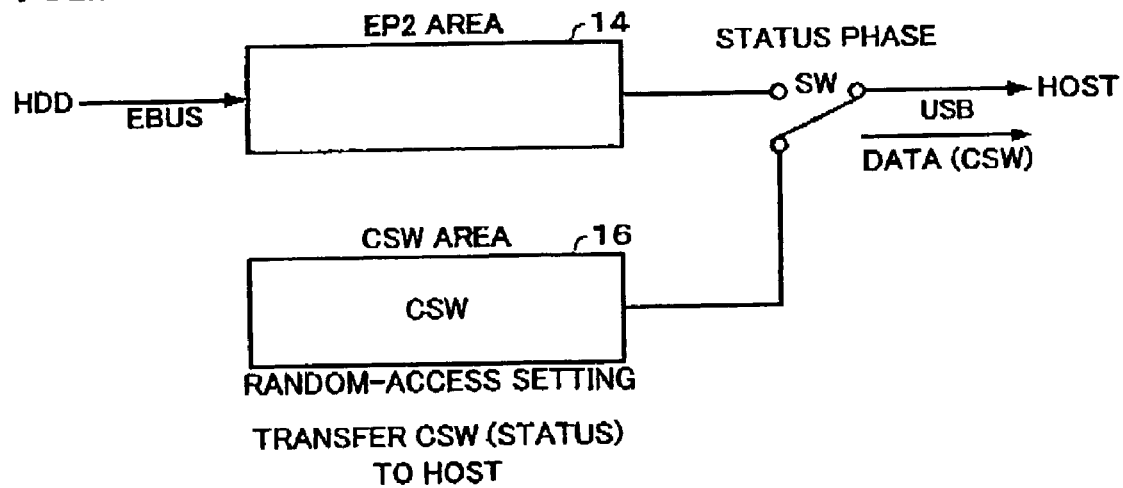

When the EP2 area 14 becomes empty (the Empty signal becomes active) and the data phase (first phase) switches to the status phase (second phase), the switch SW (switching unit) turns from the EP2 area 14 side to the CSW area 16 side, as shown in FIG. 7C. This enables the transfer of the CSW (status block packet) written into the CSW area 16 through USB (the first bus) to the host.

In the comparative example of FIGS. 6B and 6C, for example, the CSW cannot be written to the FIFO 602 until after the FIFO 602 has become empty and a transition from the data phase to the status phase has occurred. It is also inevitable that the NAK is returned in answer to IN tokens from the host, until the writing of this CSW has ended.

In contrast thereto, this embodiment prepares the CSW during the data phase period, as shown in FIG. 7B, thus enabling writing to the CSW area 16. It is therefore possible to return a data packet (CSW) in answer to an IN token from the host, at an early stage after the transition from the data phase to the status phase, as shown in FIG. 7C, enabling an increase in the speed of the processing.

USB 2.0 in particular enables high-speed transfers of data to and from the host. If NAK is returned repeatedly in answer to IN tokens from the host, as in the comparative example of FIG. 6C, the bus zone will therefore be lost and it will not be possible to utilize the high-speed data transfers of USB 2.0.

In contrast thereto, this embodiment makes it possible to return a data packet (CSW) at an early stage in answer to an IN token from the host, as shown in FIG. 7C. It is therefore possible to keep the loss of the bus zone to a minimum, enabling use of the high-speed data transfers of USB 2.0, and thus increasing the effective data transfer speed.

Note that since the CSW area 16 is set to be a randomly accessible area in accordance with this embodiment, as shown in FIGS. 7A to 7C, the CSW write processing can end early. It is therefore possible to return the data packet (CSW) in answer to the IN token from the host at an earlier stage, increasing the speed of the processing.

To ensure that data can be transferred efficiently by DMA from a device such as a hard disk drive HDD, on the other hand, it is desirable to have the EP2 area 14 set in such a manner that information that is input first thereto is output first therefrom (FIFO setting). In such a case, the EP2 area 14 could be set to be a first-in, first-out area by configuring it of serially-connected registers or memory, or is could be set to be a first-in, first-out area by a unit such as RAM address control, as will he described later.

2.2 Storage Area for Success Status

With this embodiment, a CSW0 area 18 (third storage area) into which a success status CSW0 (first status block packet) is written and a CSW1 area 19 (fourth storage area) into which a non-success status CSW1 (second status block packet) is written are provided as CSW areas (second storage areas) in the buffer, as shown in FIG. 8A.

In other words, if the status of a data transfer through EBUS (the second bus: see FIG. 12) is successful, a SW2 (switching unit) shown in FIG. 8A connects to the CSW0 area 18 side and a success status CSW0 is read from the CSW0 area 18 and transferred to the host.

If the status of a data transfer through EBUS is not successful, the SW2 (switching unit) connects to the CSW1 area 19 side, as shown in FIG. 8B, and a non-success status CSW1 is read from the CSW1 area 19 and transferred to the host.

In general, the probability of an error occurring during data transfer error is extremely low. The configuration is therefore such that the SW2 is usually connected to the CSW0 area 18 side so that the success status CSW0 is transferred to the host.

Only if a data transfer occurs does the SW2 connect to the CSW1 area 19 side, to transfer a non-success status CSW1 corresponding to the error to the host.

This makes it unnecessary to switch SW2, provided that no error occurs during data transfer through EBUS. Since the probability of an error occurring during data transfer error is extremely low, the frequency with which SW2 is switched is also extremely low. It is therefore possible to reduce the processing load on the CPU (firmware) that performs the SW2 switching processing.

Figure 9A:
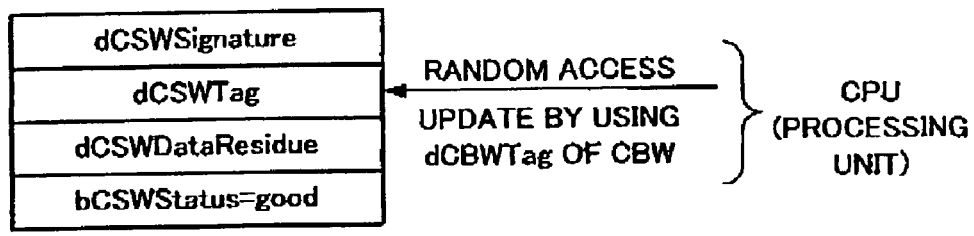
FIGS. 9A and 9B are illustrative of status block packets written beforehand to the CSW0 area and the CSW1 area.

With this embodiment, a status block packet DEFCSW0 in which is set default information for the success status is written beforehand to the CSW0 area 18, as shown in FIG. 9A. When the data transfer status is successful, a CSW0 obtained by using this DEFCSW0 is read from the CSW0 area 18 and transferred to the host.

More specifically, the values of dCSWSignature, dCSW-DataResidue, bCSWStatus of this success status DEFCSW0 are set to default values (such as 53425355h, 00000000h, and 00h=good status). The dCSWTag field (tag information linking a status block packet and a command block packet) is updated (overwritten) by using dCBWTag of the CBW when the CBW was received, by way of example. In other words, the value of dCBWTag of the CBW is written unchanged into dCSWTag.

In this manner, if DEFCSW0 into which the default information for the success status is set is written beforehand into the CSW0 area 18, the CPU (firmware) can simply update dCSWTag. The processing load on the CPU can therefore be greatly reduced, enabling an increase in the effective transfer speed.

Figure 9B:
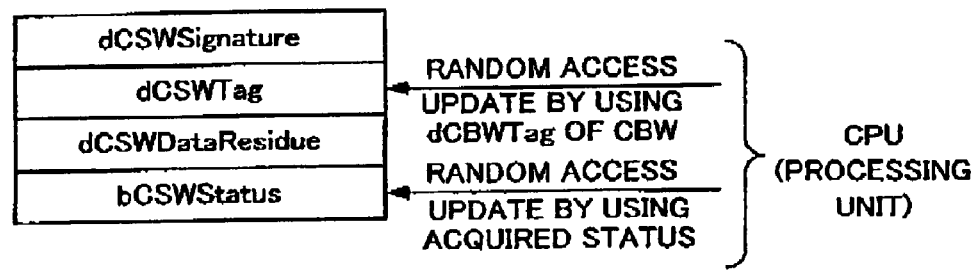

Note that the CSW1 area 19 for the non-success status has DEFCSW1 written thereinto, as shown in FIG. 9B. If the data transfer status is not successful, a CSW1 obtained by using this DEFCSW1 is read from the CSW1 area 19 and transferred to the host.

More specifically, a default value such as dCSWSignature is set in this non-success status DEFCSW1. In addition, dCSWTag is updated by using the dCBWTag of the CBW when the CBW was received, by way of example. Furthermore, bCSWStatus is updated by using the status acquired over EBUS. This makes it possible to reduce the processing load on the CPU when an error occurs.

2.3 Phase Switching

With this embodiment the information read area is switched when the phase has been switched.

More specifically, when the data phase (first phase) switches to the status phase (second phase), the read area for information (IN data, status) to be transferred from the end point EP2 to the host is switched from the EP2 area 14 (first storage area) to the CSW area 16 (second storage area: CSW0 area and CSW1 area), as shown in FIGS. 7B and 7C.

If the configuration is such that the phase switch is determined and the information read area is switched, it becomes possible to implement appropriate area switching processing with a low processing load.

The determination of phase switching in this case is described in detail below.

Figure 10:
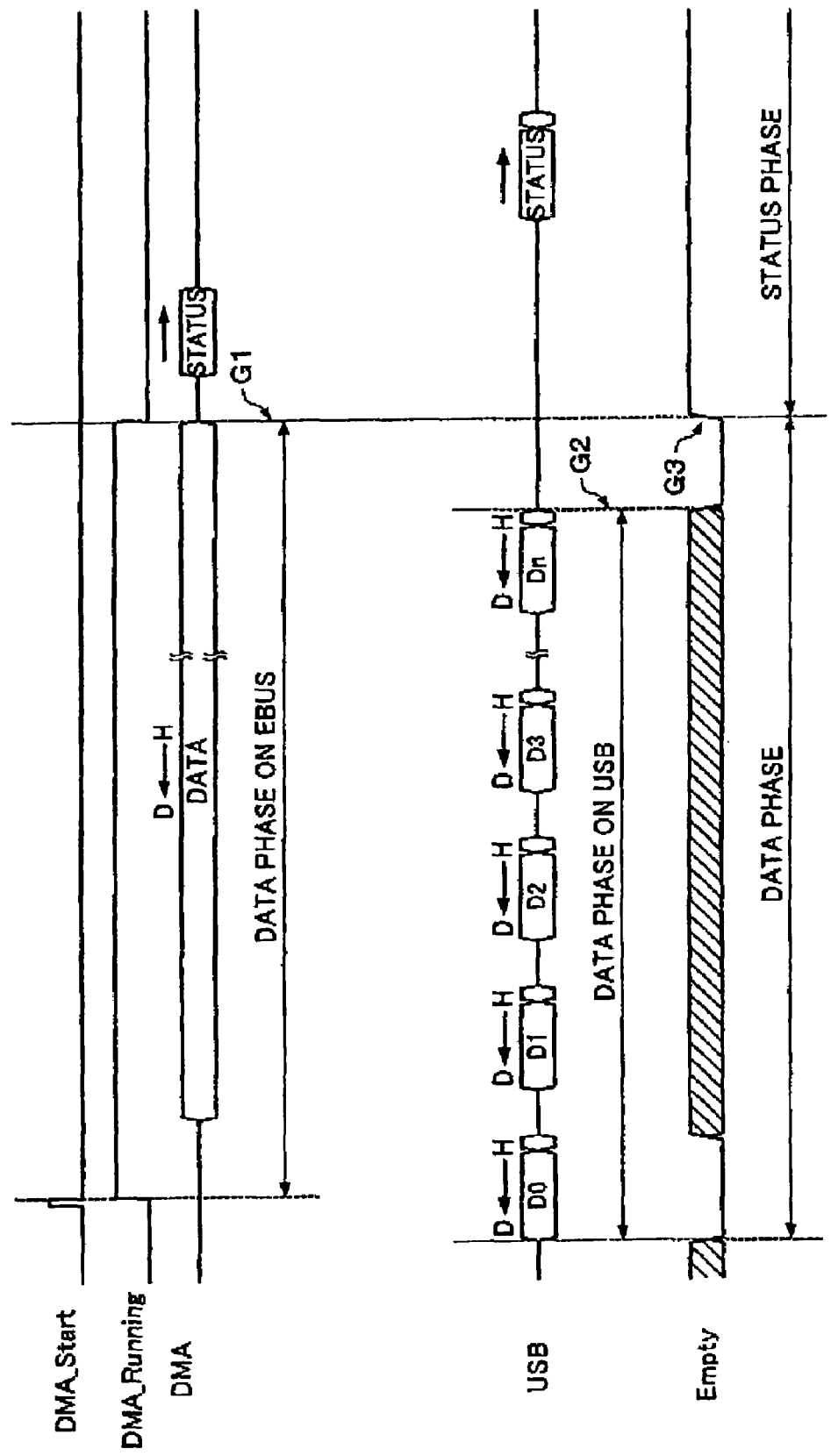
FIG. 10 is illustrative of a method of determining the switch from the data phase to the status phase.

When OUT data is transferred from the host to the device (data transfer in a first direction), phase switching can be determined as shown in FIG. 10. In other words, it is determined that the data phase has switched to the status phase at the timing of the end of data transfer (DMA transfer) through the EBUS (second bus: see FIG. 12) connected to the hard disk drive HDD or the like, as shown at G1 in FIG. 10. The timing of this G1 is delayed until after the timing of G2 at which the data transfer over USB (data phase) ends. The timing of G1 also matches the timing of G3 at which the area (OUT data storage area) becomes empty and the Empty signal becomes active. A counter provided on the EBUS side (a DMA counter 82 shown in FIG. 12) can determine the timing of G1, by counting the data size (number of transfers and data length) transferred by EBUS.

Figure 11:
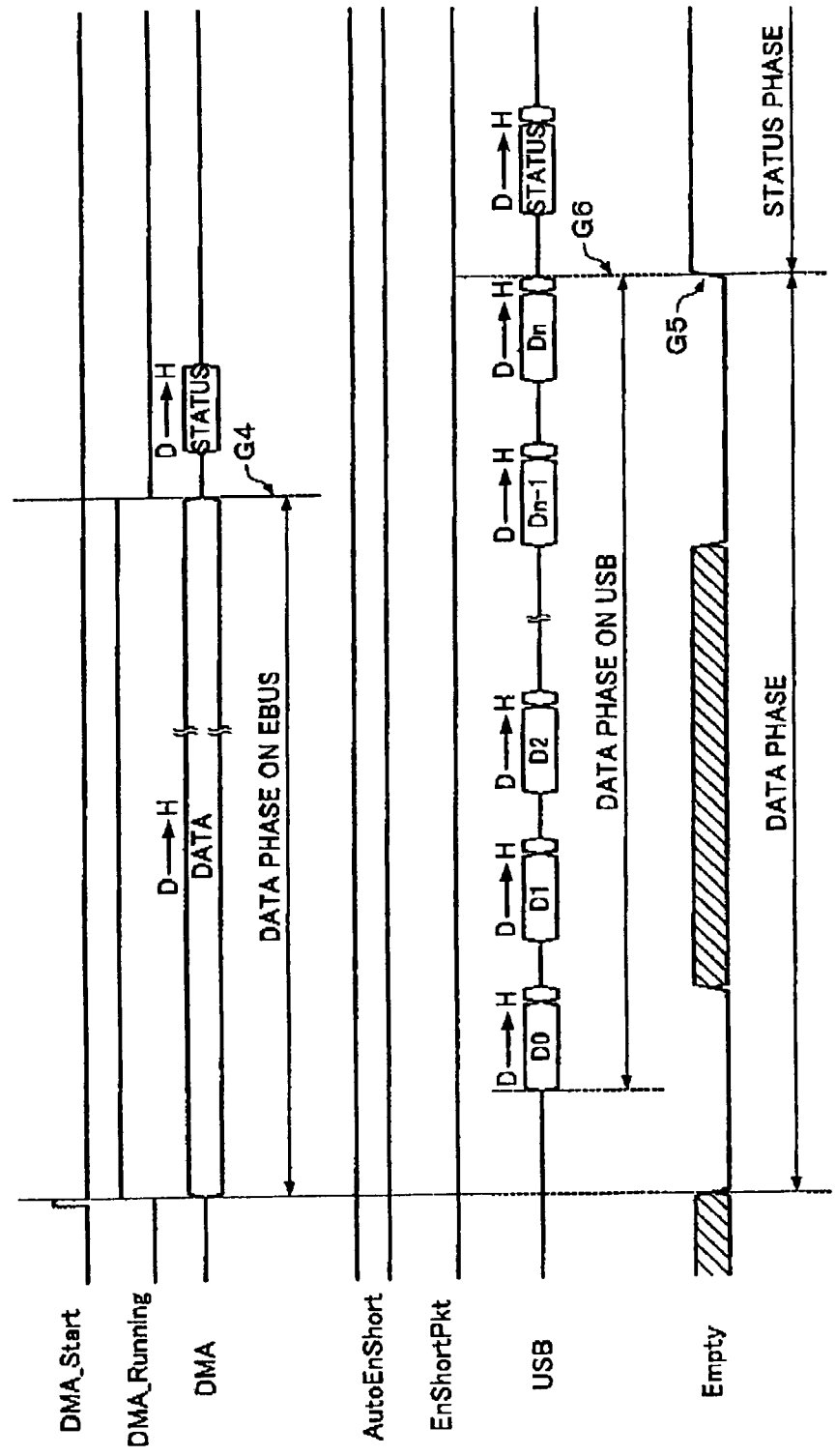
FIG. 11 is further illustrative of the method of determining the switch from the data phase to the status phase.

When IN data is transferred from the device to the host (data transfer in a second direction), on the other hand, phase switching can be determined as shown in FIG. 11. In other words, it is determined that the data phase has switched to the status phase at the timing at which the EP2 area (IN data storage area: the first storage area) becomes empty and the Empty signal goes active, as shown at G4 in FIG. 11, after it has been determined that data transfer through EBUS (transfer processing for writing a first information in the first storage area over the second bus) has ended. In this case, the timing of G4 can be determined by using a counter on the EBUS side (the DMA counter 82) to count the data size transferred by EBUS. The timing of G5 matches that of G6, at the end of data transfer over USB.

If phase switching is determined by the methods shown in FIGS. 10 and 11, it will not be necessary to provide a counter on the USB (first bus) side because the counter on the EBUS (second bus) side (the DMA counter 82) will suffice. It is therefore possible to simplify the circuit control and also simplify the circuit configuration, enabling a smaller, less expensive data transfer control device.

With this embodiment, it is determined at the timing of G5 in FIG. 11 that the data phase has switched to the status phase, and the switching processing from the EP2 area 14 to the CSW area 16 is done at that timing, as shown in FIGS. 7B and 7C. This makes it possible to switch the information read area, simply by monitoring the count of the counter (the DMA counter 82) on the EBUS side and the Empty signal, thus making it possible to implement area switching with a low processing load.

2.4 Configurational Example

Figure 12:
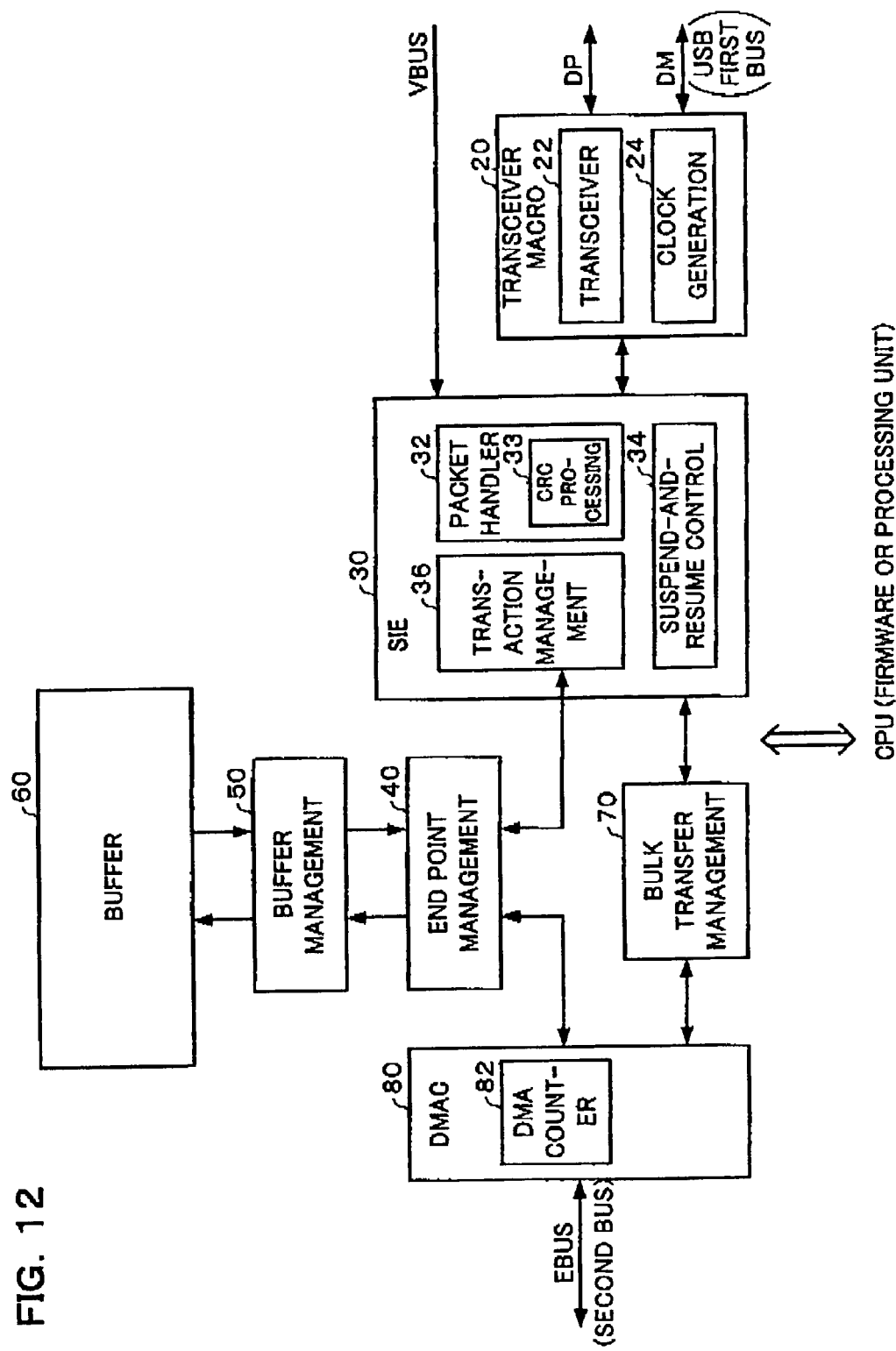
FIG. 12 shows a configurational example of the data transfer control device of this embodiment.

A configurational example of the data transfer control device of this embodiment is shown in FIG. 12.

The data transfer control device of this embodiment comprises a transceiver macro 20, an SIE 30, an end point management circuit 40, a buffer management circuit 50, a buffer 60, a bulk transfer management circuit 70, and a DMAC 80. Note that not all of the circuit blocks shown in FIG. 12 are necessary for the data transfer control device of the present invention, and thus some of them could be omitted.

In this case, the transceiver macro 20 is a circuit for implementing data transfer in FS mode or HS mode by USB (the first bus). A macro cell conforming to the USB 2.0 transceiver macrocell interface (UTMI), which defined interface specifications for parts of the physical-layer and logical-layer circuitry under USB 2.0, could be used as this transceiver macro 20, by way of example. This transceiver macro 20 comprises a transceiver circuit 22 and a clock generation circuit 24.

The transceiver circuit 22 comprises an analog front-end circuit (reception and transmission circuitry) for transmitting and receiving data by USB (a first bus), using difference signals DP and DM. It also comprises circuitry for processing such as bit stuffing, bit unstuffing, serial-to-parallel conversion, parallel-to-serial conversion, NRZI decoding, NRZI encoding, and sampling clock generation.

The clock generation circuit 24 is a circuit for generating clocks such as those used in the generation of the operating clock or sampling clock used by the data transfer control device, and comprises components such as PLLs and oscillation circuits for generating 480-MHz and 60-MHz clocks.

A serial interface engine (SIE) is a circuit for performing various types of processing such as USB packet transfer processing, and it comprises a packet handler circuit 32, a suspend-and-resume control circuit 34, and a transaction management circuit 36.

The packet handler circuit 32 is a circuit for assembling (creating) or analyzing packets formed of headers and data, and it comprises a CRC processing circuit 33 that generates and decodes CRCs.

The suspend-and-resume control circuit 34 is a circuit that performs sequence control during the suspension and resumption of processing.

The transaction management circuit 36 is a circuit for managing transactions made up of token, data, handshake, and other packets. More specifically, when a token packet is received, this circuit confirms whether or not that packet has the device's own address and, if it does have that address, it performs processing to transfer packets to or from the host, then processing for transferring a handshake packet.

The end point management circuit 40 is a circuit for managing the end points that form entrances to the various storage areas of the buffer, and it comprises components such as registers (a register set) for storing attribute information for those end points.

The buffer management circuit 50 is a circuit for managing the buffer 60, and is formed of components such as RAM. More specifically, it generates write addresses or read addresses and performs processing to write data to the buffer 60 or read data from the buffer 60.

The buffer 60 (packet storage unit) is designed to store data (packets) temporarily, for transfer through USB, and it has various functions such as compensating for any speed difference between the data transfer speed of USB (the first bus) and the data transfer speed of EBUS (the second bus, or DNA bus). Note that EBUS is an external bus that connects together devices such as hard disk drives, CD drives, and scanners.

With this embodiment, if several types of information are allocated as information to be to be transferred through one end point, a first storage area (such as a data storage area) for a first information (such as data) and a second storage area (such as a status storage area) for a second information (such as a status block) are provided (ensured) on the buffer 60.

The bulk transfer management circuit 70 is a circuit for managing bulk transfers under USB.

The DMAC 80 is a DMA controller for performing DMA transfers through EBUS, and comprises a DMA counter 82. The DMA counter 82 is a circuit for counting the size of data (number of transfers) to be transmitted or received through EBUS.

2.5 Detailed Configurational Example

Figure 13:
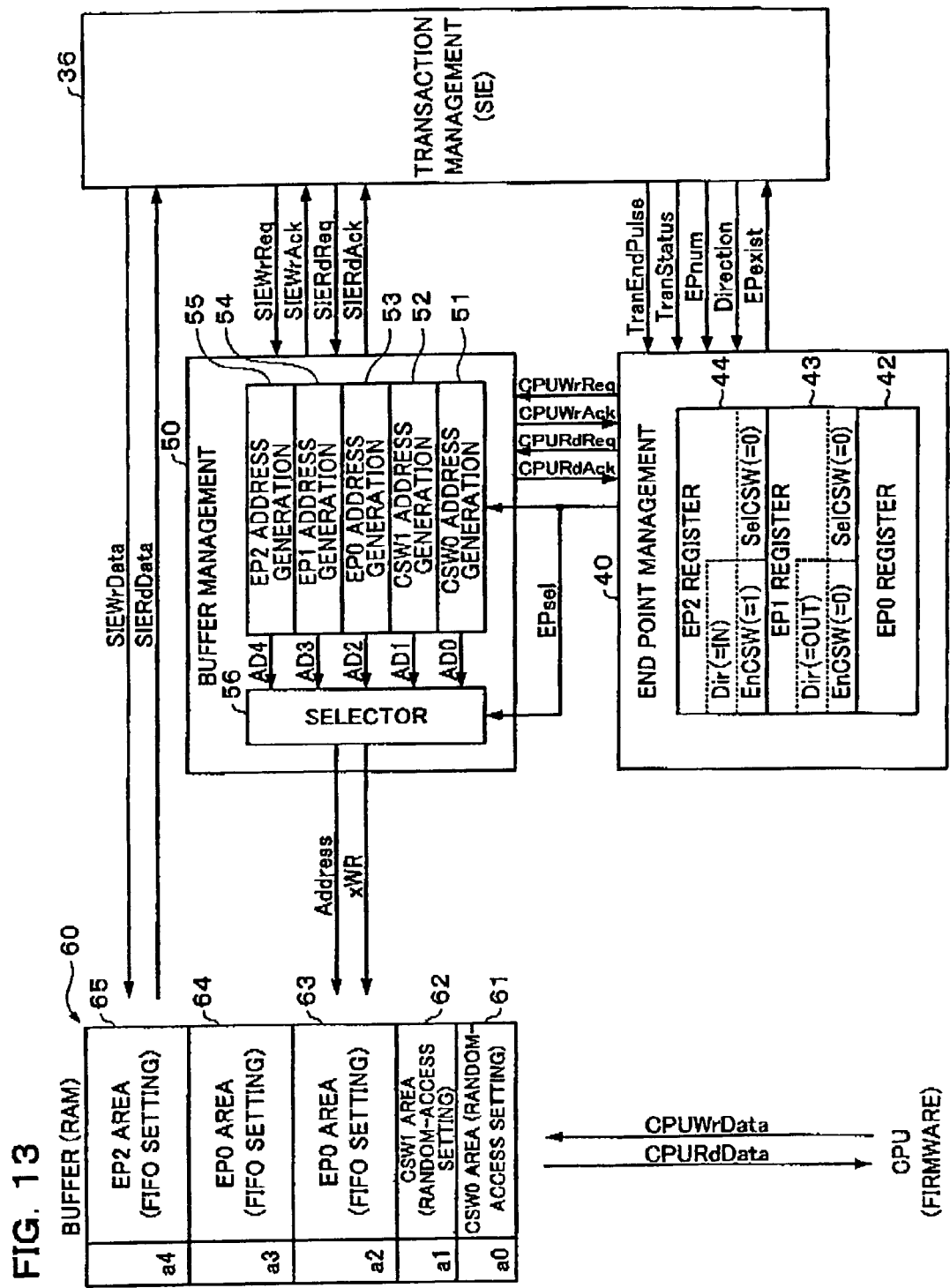
FIG. 13 shows a detailed example of the configuration of the transaction management circuit, end point management circuit, buffer management circuit, and buffer.

A detailed example of the configuration of the transaction management circuit 36 (SIE), the end point management circuit 40, the buffer management circuit 50, and the buffer 60 is shown in FIG. 13.

The buffer 60 (RAM) comprises a CSW0 area 61 for storing a CSW (status block) that is information allocated to the end point EP2, an CSW1 area 62 (for non-success status), an EP0 area 63 for storing control that is information allocated to EP0, an EP1 area 64 for storing OUT data which is information allocated to EP1, and an EP2 area 65 for storing IN data which is information allocated to EP2.

In FIG. 13, the CSW0 area 61 and CSW1 area 62 are set in such a manner that they can be accessed randomly by the CPU (firmware or processing unit). The EP0, EP1, and EP2 areas 63, 64, and 65, on the other hand, are set in such a manner that information that is input first thereto is output first therefrom (FIFO).

The transaction management circuit 36 outputs to the buffer 60 write data SIEWrData (a write packet) that has been transferred through USB, and inputs read data SIERdData (a read packet) from the buffer 60.

The transaction management circuit 36 also outputs a write request signal SIEWrReq and a read request signal SIERdReq to the buffer management circuit 50, and receives a write acknowledge signal SIEWrAck and a read acknowledge signal SIERdAck from the buffer management circuit 50.

The transaction management circuit 36 further outputs a transaction end signal TranEndpulse, a transaction status signal TranStatus, an end point number specification signal EPnum, and a transfer direction specification signal Direction to the end point management circuit 40, and receives an end point presence signal EPexist from the end point management circuit 40.

The end point management circuit 40 comprises registers (a register set) 42, 43, and 44 for describing attribute information of each end point (such as end point number and maximum packet size). It also generates end point selection signal EPsel based on various signals from the transaction management circuit 36 and the attribute information, for output to the buffer management circuit 50.

The end point management circuit 40 also outputs a write request signal CPUWrReq and a read request signal CPURdReq from the CPU to the buffer management circuit 50, and receives a write acknowledge signal CPUWrAck and a read acknowledge signal CFURdAck sent from the buffer management circuit 50 to the CPU.

The EP0 register 42 comprised within the end point management circuit 40 is a register for describing attribute information of the control end point that is defined as default by the USB specification.

The EP1 and EP2 registers 43 and 44 are registers used for describing attribute information of the bulk-out and bulk-in end points that are defined by the Bulk-only specification. Note that any of the end points EP1 to EP15 can be set to be the bulk-out or bulk-in end point, from the device side.

The EP1 register 43 causes a flag DIR, which indicates the data transfer direction, to be set to OUT and EP1 to be set to be the bulk-out end point.

The EP1 register 43 also sets a flag EnCSW to 0. This flag EnCSW is used for connecting the end point to either the CSW0 area 61 or the CSW1 area 62 of the buffer 60, so that if EnCSW is set to 1, the bulk-in end point is connected to the CSW0 area 61 or the CSW1 area 62.

The EP1 register 43 also causes a flag SelCSW to be set to 0. This SelCSW flag is used for selecting which of the CSW0 area 61 and the CSW1 area 62 is to be connected to the bulk-in end point. For example, a bulk-in end point wherein EnCSW is set to 1 and SelCSW is also set to 1 is connected to the CSW0 area 61. A bulk-in end point wherein EnCSW is set to 1 and SelCSW is set to 0, on the other hand, is connected to the CSW1 area 62.

With the EP2 register 44, the flag DIR indicating the data transfer direction is set to IN and EP2 is set to be the bulk-in end point.

With the EP2 register 44, EnCSW is set to 1 and SelCSW is set to 0. This setting state therefore causes the end point EP2 to be connected to the CSW0 area 61. In that case, if SelCSW is set to 1, by way of example, the end point EP2 is connected to the CSW1 area 62, but if EnCSW is set to 0, EP2 is connected to the EP2 area 65.

The buffer management circuit 50 receives a write or read request signal from the transaction management circuit 36 or the end point management circuit 40 and the end point selection signal EPsel from the end point management circuit 40. and outputs an address Address and a write pulse xWR (where "x" means negative logic) to the buffer 60. This buffer management circuit 50 comprises CSW0, CSW1, EP0, EP1, and EP2 address generation circuits 51, 52, 53, 54, and 55, and a selector 56.

In this case, the CSW0 address generation circuit 51 generates a write or read address AD0 for SIEWrData or SIERdData, for the CSW0 area 61 (start address a0).

The CSW1 address generation circuit 52 generates a write or read address AD1 for SIEWrData or SIERdData, for the CSW1 area 62 (start address a1).

Similarly, the EP0, EP1, and EP2 address generation circuits 53, 54, and 55 each generate a write or read address AD2, AD3, or AD4 for SIEWrData or SIERdData, for the EP0, EP1, or EP2 area 63, 64, or 65 (start address a2, a3, or a4). respectively. More specifically, they generate sequentially incremented (or decremented) addresses AD2, AD3, and AD4 as start addresses a2, a3, and a4.

The selector 56 selects one of AD0 to AD4, based on EPsel, and outputs it to the buffer 60 as the Address, and it also outputs the write pulse xWR to the buffer 60. More specifically, AD0 is selected as Address for output to the buffer 60 if CSW0 is specified by EPsel, AD1 is selected therefor if CSW1 is specified, AD2 is selected therefor if EP0 is specified, AD3 is selected therefor if EP1 is specified, and AD4 is selected therefor if EP2 is specified.

Note that the configuration is such that CPUWrData can be written by the CPU to the CSW0 area 61 and the CSW1 area 62. In that case, the buffer management circuit 50 is configured to output Address and xWr for writing CPUWrData to the buffer 60, based on EPsel and CPUWrReq from the end point management circuit 40.

Figure 14:
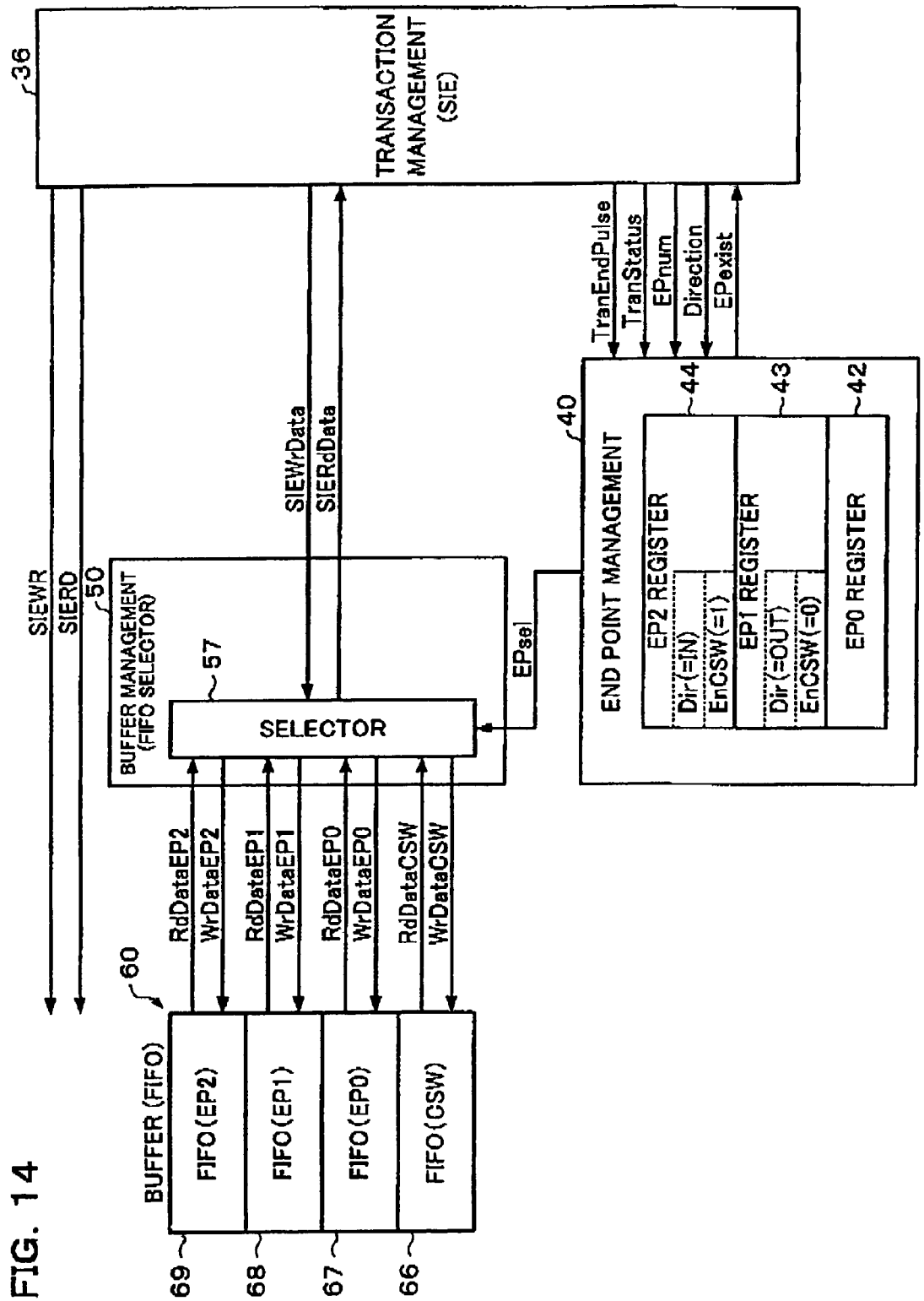
FIG. 14 shows another detailed example of the configuration of the transaction management circuit, end point management circuit, buffer management circuit, and buffer.

Another example of the configuration of the transaction management circuit 36, the end point management circuit 40, the buffer management circuit 50, and the buffer 60 is shown in FIG. 14.

FIG. 14 differs from FIG. 13 in that the buffer 60 comprises FIFOs 66, 67, 68, and 69 (such as serially connected registers or memory) for CSW (CSW0, CSW1), EP0, EP1, and EP2.

A selector 57 comprised by the buffer management circuit 50 outputs SIEWrData from the transaction management circuit 36 to the buffer 60 as one of WrDataCSW, WrDataEP0, WrDataEP1, or WrDataEP2, based on EPsel from the end point management circuit 40.

Alternatively, the selector 57 selects one of RdDataCSW, RdDataEP0, RdDataEP1, or RdDataEP2 from the buffer 60, based on EPsel, and outputs it as SIERdData to the transaction management circuit 36.

More specifically, WrDataCSW and RdDataCSW are selected if CSW is specified by EPsel, WrDataEP0 and RdDataEP0 are selected if EP0 is specified, WrDataEP1 and RdDataEP1 are selected if EP1 is specified, and WrDataEP2 and RdDataEP2 are selected if EP2 is specified.

The writing of data to the buffer 60 is done by a write pulse SIEWR from the transaction management circuit 36, and the reading of data from the buffer 60 is done by a read pulse SIERD from the transaction management circuit 36.

Note that the FIFO 66 (CSW) of FIG. 14 could be set to be a randomly accessible storage area.

2.6 Operation

Timing waveform charts that illustrate details of the operation of the data transfer control device of this embodiment as shown in FIGS. 15 to 20.

2.6.1 Success Status

Figure 15:
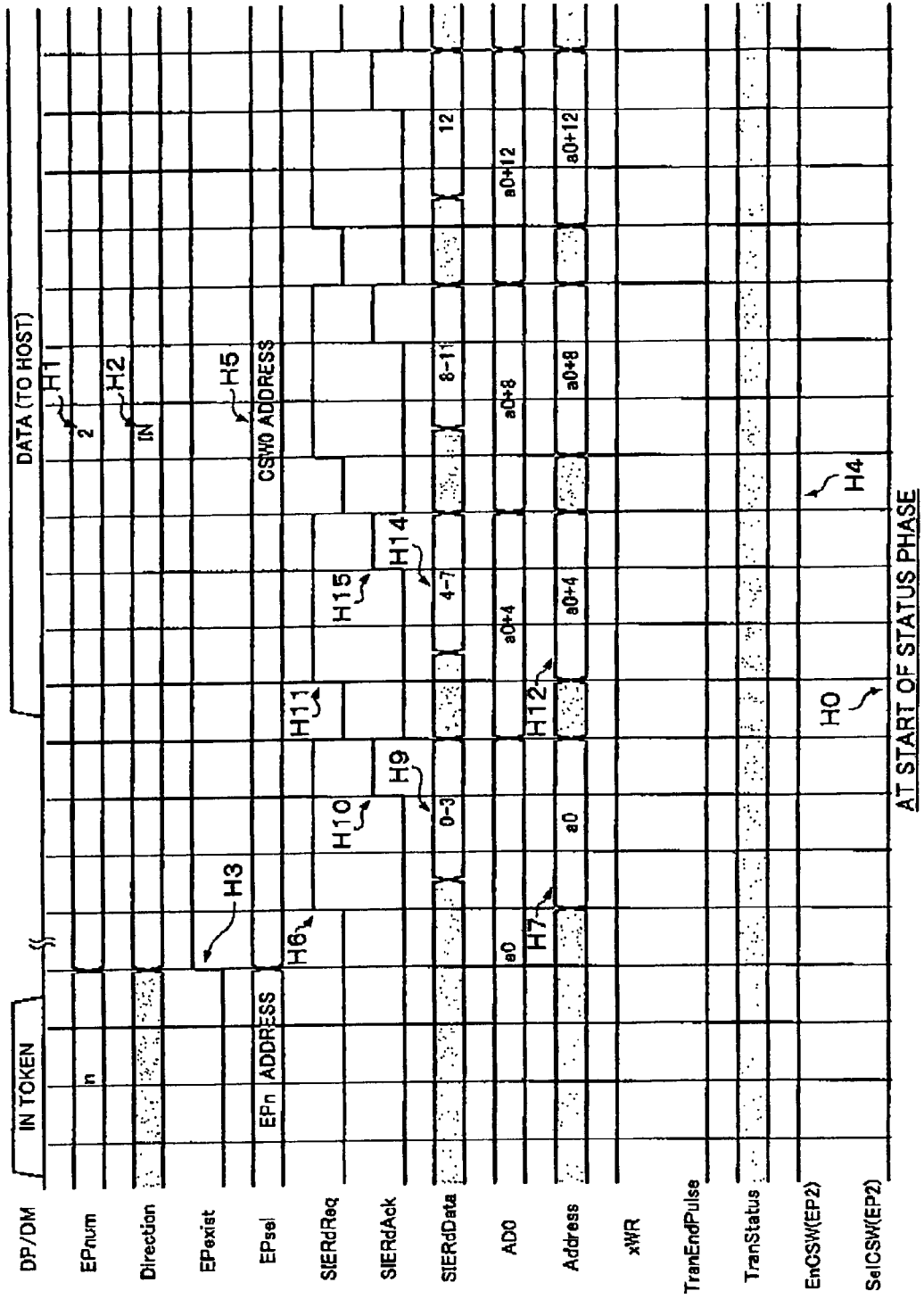
FIG. 15 is a timing waveform chart illustrative of the operation of this embodiment at the beginning of the status phase.
Figure 16:
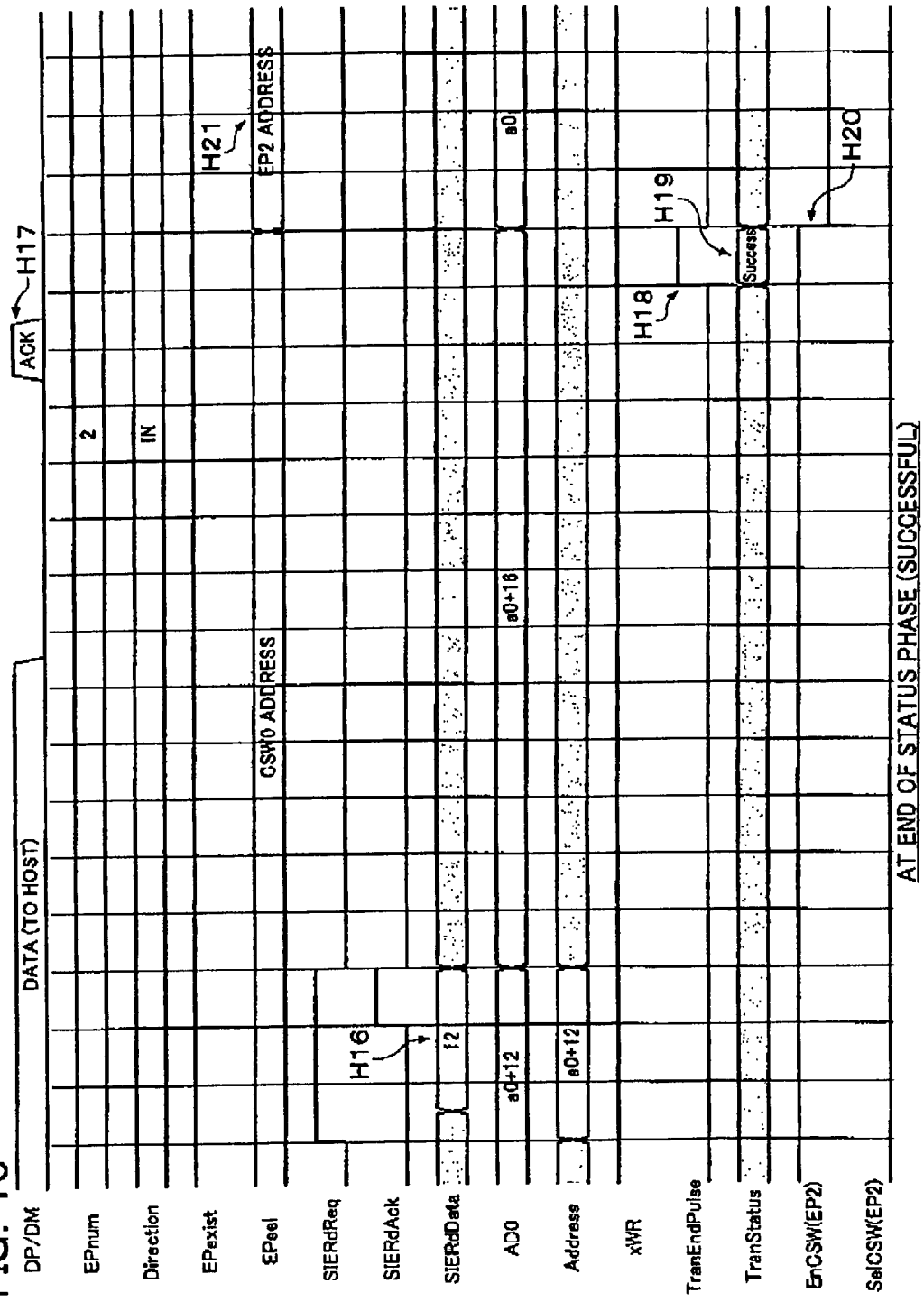
FIG. 16 is a timing waveform chart illustrative of the operation of this embodiment when data transfer is successful.
Figure 17:
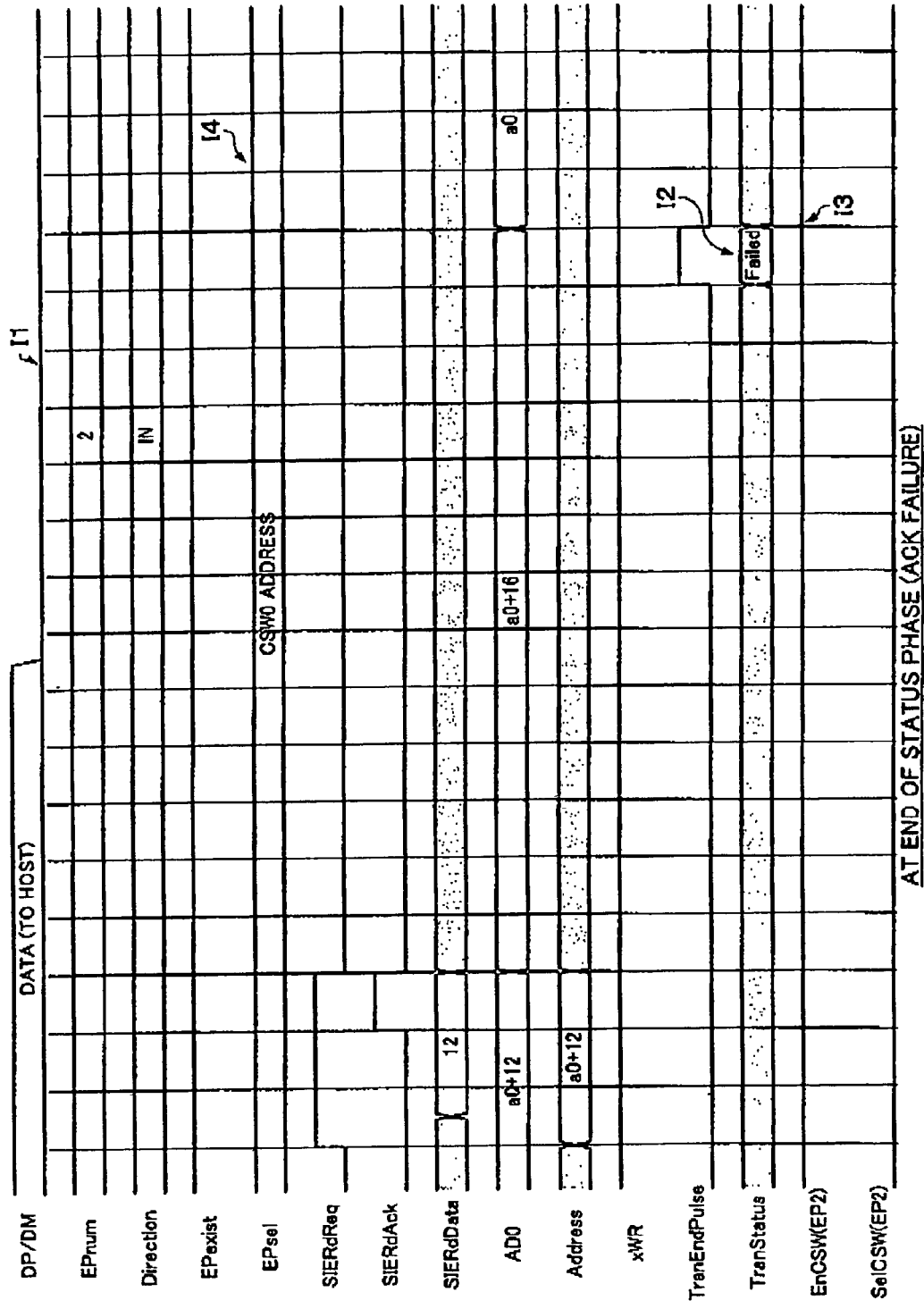
FIG. 17 is a timing waveform chart illustrative of the operation of this embodiment when ACK failure occurs.

The timing waveform charts of FIGS. 15, 16, and 17 show data transfer over the EBUS (second bus) when the status is successful. FIG. 15 is a timing waveform chart for the beginning of the status phase (the phase in which the success status is transferred) and FIGS. 16 and 17 show the end of the status phase.

As shown at H1 and H2 in FIG. 15, when the transaction management circuit 36 sets EPnum to 2 (end point number=2) and Direction to IN, the existence of the register 44 for the bulk-in end point EP2 (see FIG. 13) causes the end point management circuit 40 to make EPexist go active (high) at H3.

Since the EnCSW for the end point EP2 is set to high (1) at this point, as shown at H4, the end point management circuit 40 outputs EPsel, which specifies the address AD0 of the CSW0 area 61, to the buffer management circuit 50. This causes the selector 56 of the buffer management circuit 50 to select the address AD0 generated by the CSW0 address generation circuit 51.

When the transaction management circuit 36 makes SIERdReq go active, as shown at H6, the buffer management circuit 50 outputs AD0=a0 from the CSW0 address generation circuit 51 as Address, as shown at H7. This causes bytes 0 to 3 of CSW0 (SIERdData) to be read, using a0 of the CSW0 area 61 of the buffer 60 as the start address, as shown at H9. SIERdAck subsequently goes active at H10 and an acknowledgment is returned to the transaction management circuit 36.

When the transaction management circuit 36 then makes SIERdReq go active, as shown at H11, the buffer management circuit 50 outputs AD0=(a0+4) as Address to the buffer 60, as shown at H12. This causes bytes 4 to 7 of CSW0 (SIERdData) to be read, using (a0+4) of CSW0 area 61 as the start address, as shown at H14. SIERdAck subsequently goes active at H15 and an acknowledgment is returned to the transaction management circuit 36.

By repeating the above read processing, all of bytes 0 to 12 of CSW0 (a total of 13 bytes) are read from the CSW0 area 61 and transferred to the host.

When an appropriate ACK is returned from the host, as shown at H17 (in FIG. 16), the transaction management circuit 36 makes TranEndPulse go active, as shown at H18, and also sets TranStatus to Success, as shown at H19, to inform the end point management circuit 40 that the transaction was successful.

When that happens, EnCSW of the end point EP2 (the register 44 in FIG. 13) is set to low (0), as shown at H20. This causes a switching of areas, as shown at H21, and, if the end point EP2 has been selected for the subsequent data phase, the selector 56 of the buffer management circuit 50 selects the address AD4 of the EP2 area 65 as Address.

The timing waveform chart of FIG. 17 shows the operation when an ACK failure is generated by a status phase transaction.

If ACK is not returned back from the host with respect to the success status that had been transferred to the host, as shown at I1 in FIG. 17, the transaction management circuit 36 outputs TranStatus, indicating that an ACK failure has occurred, to the end point management circuit 40, as shown at I2. When that happens, EnCSW of the end point EP2 does not go low at I3 of FIG. 17, unlike at H20 in FIG. 16. For that reason, EPsel does not change at I4 and area switching from the CSW0 area 61 to the EP2 area 65 does not occur.

2.6.2 Non-success Status

Figure 18:
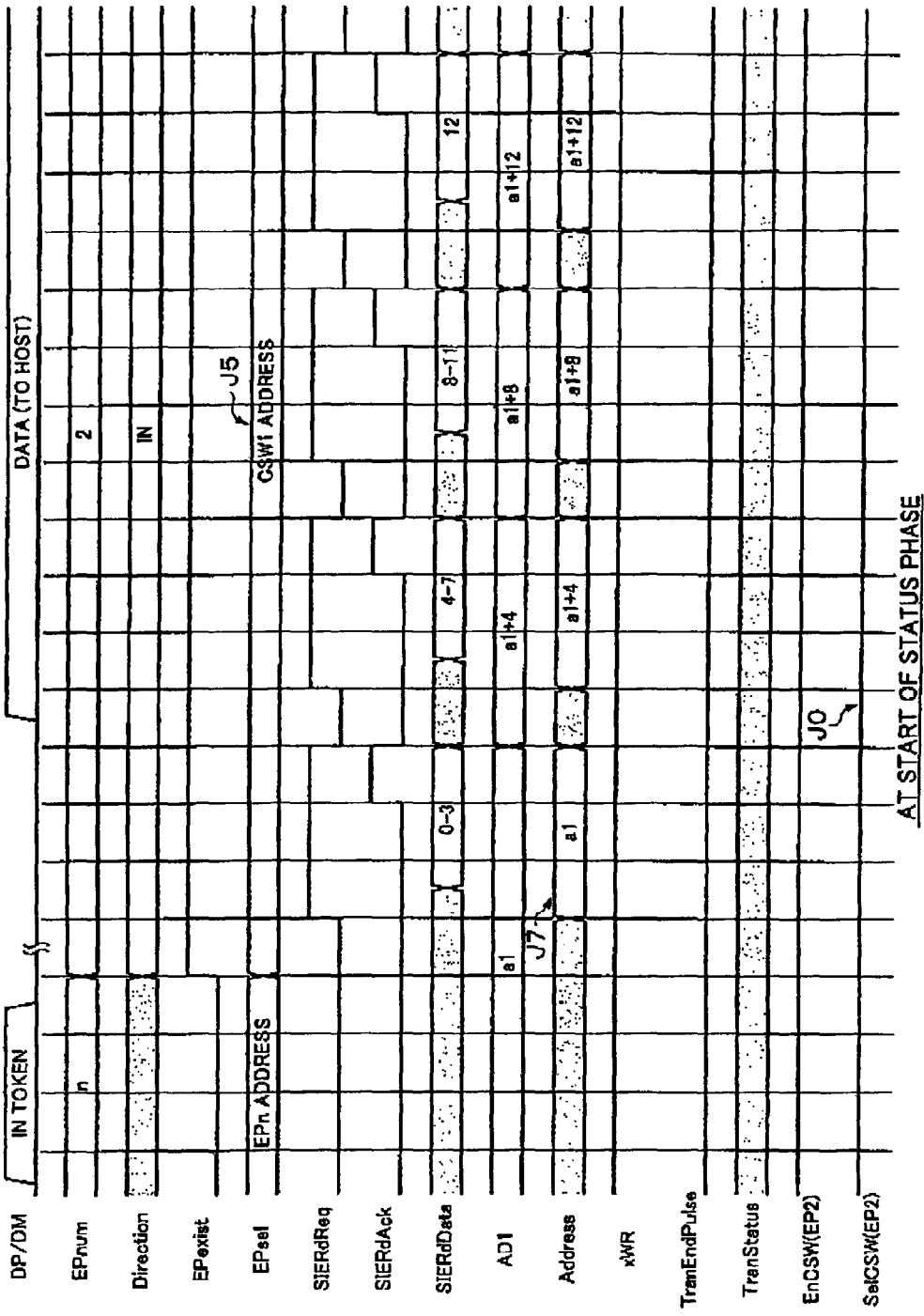
FIG. 18 is a timing waveform chart illustrative of the operation of this embodiment when the status of data transfer over EBUS is not successful.
Figure 19:
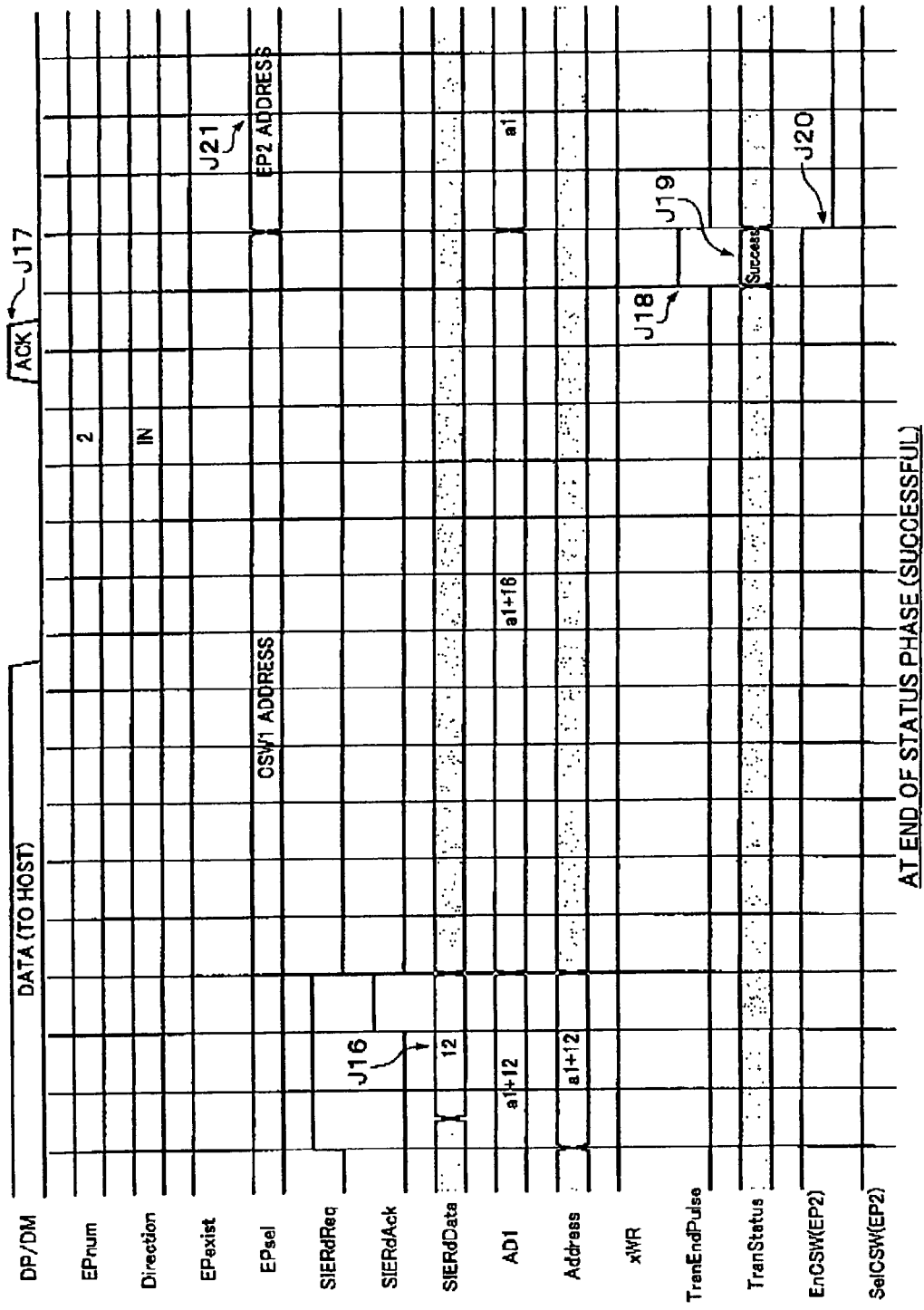
FIG. 19 is a timing waveform chart further illustrative of the operation of this embodiment when the status of data transfer over EBUS is not successful.
Figure 20:
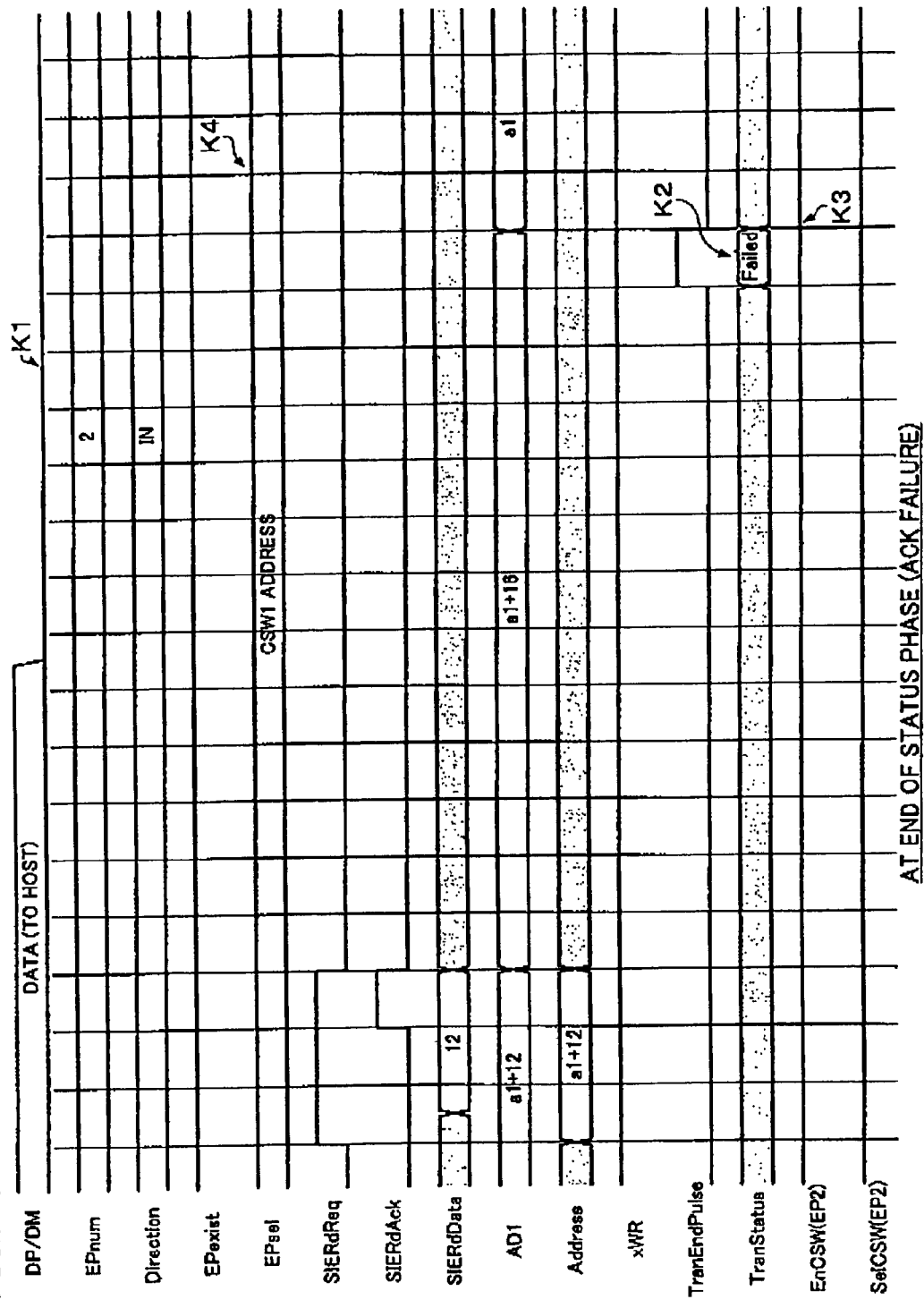
FIG. 20 is a timing waveform chart even further illustrative of the operation of this embodiment when the status of data transfer over EBUS is not successful.

The timing waveform charts of FIGS. 18, 19, and 20 show data transfer over the EBUS (second bus) when the status is not successful. FIG. 18 is a timing waveform chart for the beginning of the status phase (the phase in which the non-success status is transferred) and FIGS. 19 and 20 show the end of the status phase.

J0 in FIG. 18 differs from H0 in FIG. 15 in that SelCSW (EP2), which is the area selection signal, is at high (0) and the CSW1 area 62 is selected. J5 in FIG. 18 therefore differs from H5 in FIG. 15 in that the end point management circuit 40 outputs EPsel that specifies the address AD1 of the CSW1 area 62. This causes the buffer management circuit 50 to output AD1= a1 from the CSW1 address generation circuit 52 as Address to the buffer 60.

If all of bytes 0 to 12 of CSW1 (a total of 13 bytes) are then read from the CSW1 area 62, as shown at J16 in FIG. 19, and an appropriate ACK is returned from the host as shown at J17, TranEndPulse goes active at J18 and Success is output as TranStatus at J19. This informs the end point management circuit 40 that the transaction informing the host of the non-success status has been successful. EnCSW (EP2) then goes low at J20 and the areas are switched at J21.

The timing waveform chart of FIG. 20 shows the operation when an ACK failure is generated by a status phase transaction (the phase in which the non-success status is transferred).

If ACK is not returned back from the host with respect to the non-success status that had been transferred to the host, as shown at K1 in FIG. 20. the transaction management circuit 36 outputs TranStatus, indicating that an ACK failure has occurred, as shown at K2. When that happens, EnCSW does not go low at K3 of FIG. 20, unlike at J2 in FIG. 19. For that reason, EPsel does not change at K4 and area switching from the CSW0 area 61 to the EP2 area 65 does not occur.

2.7 Comparison of Comparative Example and This Embodiment

An example of a timing waveform chart of a comparative example (see FIGS. 6A to 6D) is shown in FIG. 21 and an example of a timing waveform chart of this embodiment is shown in FIG. 22.

In the comparative example of FIG. 21A, by way of example, the presence of IN data in the FIFO for the end point EP2 makes it impossible to write CSW to the FIFO (EP2). The CSW write processing therefore begins after the transition to the status phase, as shown at L1 in FIG. 21A. This means that a NAK must be returned in answer to each IN token from the host up until the end of this write processing, as shown at L2 and L3. For that reason, the transfer of the CSW from the host is delayed, as shown at L4, and thus the transition to the next command phase is also delayed, as shown at L5. As a result, there is a loss of the bus zone, reducing the effective transfer speed.

With this embodiment shown in FIG. 21B, on the other hand, CSW areas (CSW0 area and CSW1 area) are provided separately from the EP2 area, so that the processing for preparing the CSW and the processing for writing that CSW to the CSW area can be started during the data phase. Although there is a possibility that NAK will be returned initially with respect to an IN token from the host, as shown at L6, if EnCSW goes high at L7 and a switch occurs from the EP2 area to the CSW area, the CSW in the CSW area can be transferred immediately to the host, as shown at L8. The transition to the command phase therefore occurs sooner than in the comparative example of FIG. 21A, as shown at L9. As a result, the loss of the bus zone can be kept to a minimum, enabling an increase in the effective transfer speed in comparison with the comparative example.

A flowchart of the processing performed by the firmware (CPU) of the comparative example is shown in FIG. 22A and a flowchart of the firmware processing in accordance with this embodiment is shown in FIG. 22B.

In the comparative example of FIG. 22A, the firmware first determines whether or not the data phase has ended (step S21).

If it is determined that the data phase has ended, the firmware writes the CSW to the FIFO for EP2 (step S22, see L1 of FIG. 21A). Since the CSW is 13 bytes, less than the maximum packet size, the firmware enables the transfer of a short packet (step S23).

It then determines whether or not the IN transaction that transfers the CSW to the host has ended (step S24) and processing ends if it is determined that it has ended (step S25). If the transaction has not ended, on the other hand, the firmware determines whether a transaction other than an IN transaction (such as an OUT transaction) has been performed (step S26). If it is determined that this is not an IN transaction, it is possible that the current phase does not match between the host and the device, so a transition to error processing occurs (step S27). If it is determined that no transaction has occurred, on the other hand, the flow returns to step S24.

With this embodiment shown in FIG. 22B, the firmware first determines whether or not the data phase has ended (step S31).

In this case, if data transfer through EBUS has ended and also the EP2 area is empty (Empty is active), the firmware determines that the data phase is completed and the phase has switched to the status phase, as described with reference to FIG. 11.

Since this embodiment is provided with CSW areas that are separate from the EP2 area, it is possible to prepare the CSW area during the data phase and finish the CSW write processing earlier, unlike in the comparative example.

If it is determined that the data phase has ended, the firmware uses SelCSW to select a CSW area (either the CSW0 or the CSW1 area) and also sets EnCSW to 1 (step S32: See L7 in FIG. 21).

The firmware then determines whether or not the transaction that transfers the CSW to the host has ended (step S33) and, if it is determined that it has ended, it ends the processing (step S34). If the transaction has not ended, on the other hand, the firmware determines whether a transaction other than an IN (CSW) transaction has been performed (step S35). If it is determined that no transaction has been performed, a transition to error processing occurs (step S36). If it was determined to be a CSW transaction, on the other hand, the flow returns to step S33.

3. Electronic Equipment

The description now turns to examples of electronic equipment comprising the data transfer control device of this embodiment of the invention.

Figure 23A:
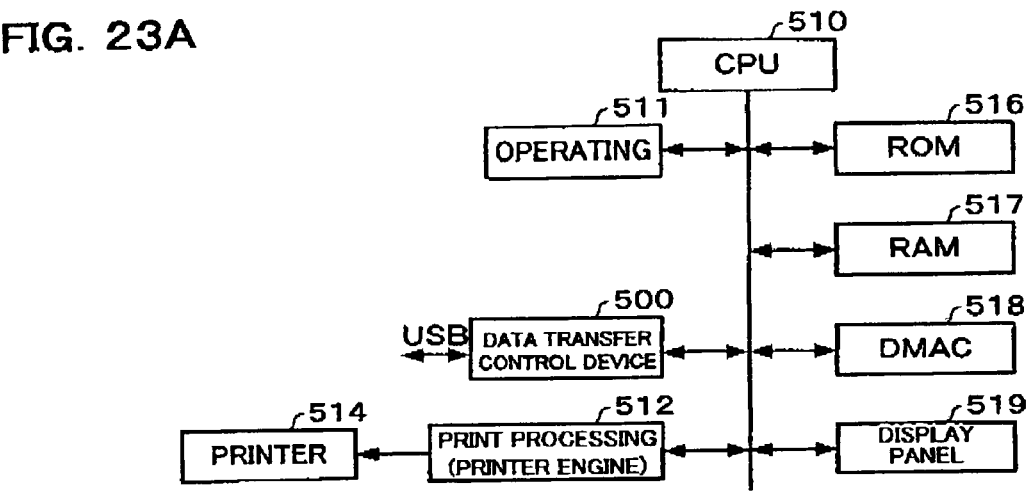
FIGS. 23A, 23B, and 23C are internal block diagrams of various items of electronic equipment.
Figure 24A:
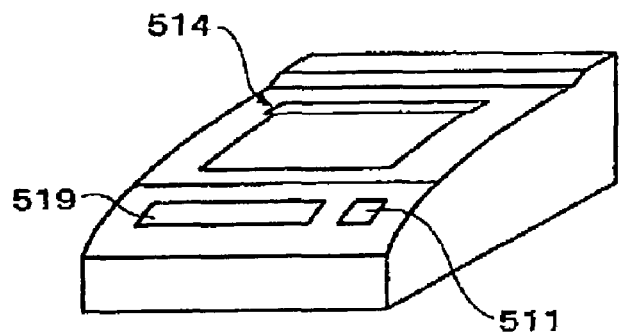
FIG. 24A, FIG. 24B, FIG. 24C show typical external views of various items of electronic equipment.

An internal block diagram of a printer that is one example of such electronic equipment is shown in FIG. 23A with an external view thereof being shown in FIG. 24A. A CPU (microcomputer) 510 has various functions, including that of controlling the entire system. An operating section 511 is designed to enable the user to operate the printer. Data such as a control program and fonts is stored in a ROM 516, and a RAM 517 functions as a work area for the CPU 510. A DMAC 518 is a DMA controller for transferring data through the CPU 510. A display panel 519 is designed to inform the user of the operational state of the printer.

Serial print data that has been send in from another device such as a personal computer via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a print section (a device for outputting data) 514 comprising components such as a print head.

Figure 23B:
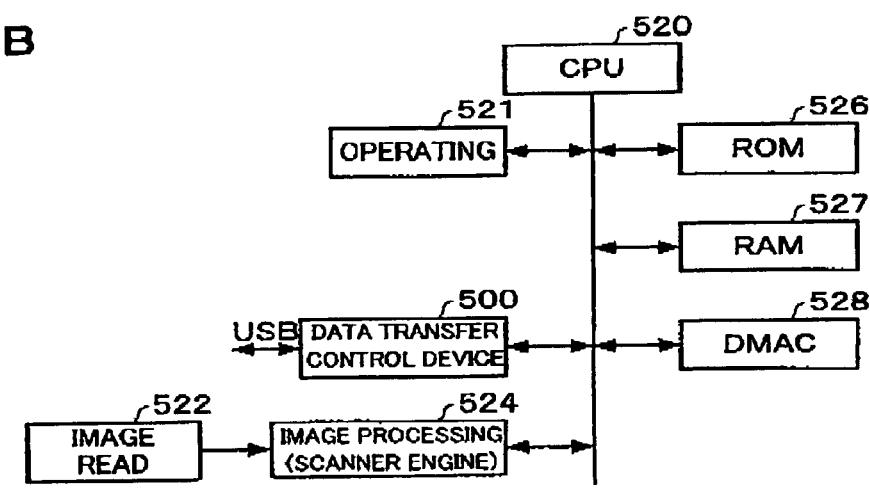
Figure 24B:
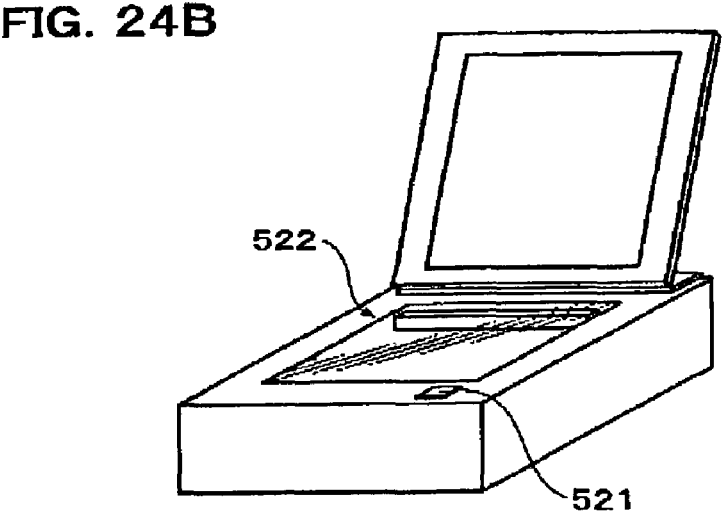

An internal block diagram of a scanner that is another example of electronic equipment is shown in FIG. 23B with an external view thereof being shown in FIG. 24B. A CPU 520 has various functions, including that of controlling the entire system. An operating section 521 is designed to enable the user to operate the scanner. Data such as a control program is stored in a ROM 526, and a RAM 527 functions as a work area for the CPU 520. A DMAC 528 is a DMA controller.

An image of a document is read in by an image read section (a device for fetching data) 522, which comprises components such as a light source and an opto-electric converter, and data of the read-in image is processed by an image processing section (a scanner engine) 524. The processed image data is sent to the data transfer control device 500 by the CPU 520 or DMAC 528. The data transfer control device 500 converts that parallel image data into serial data and sends it to another device such as a personal computer via USB.

Figure 23C:
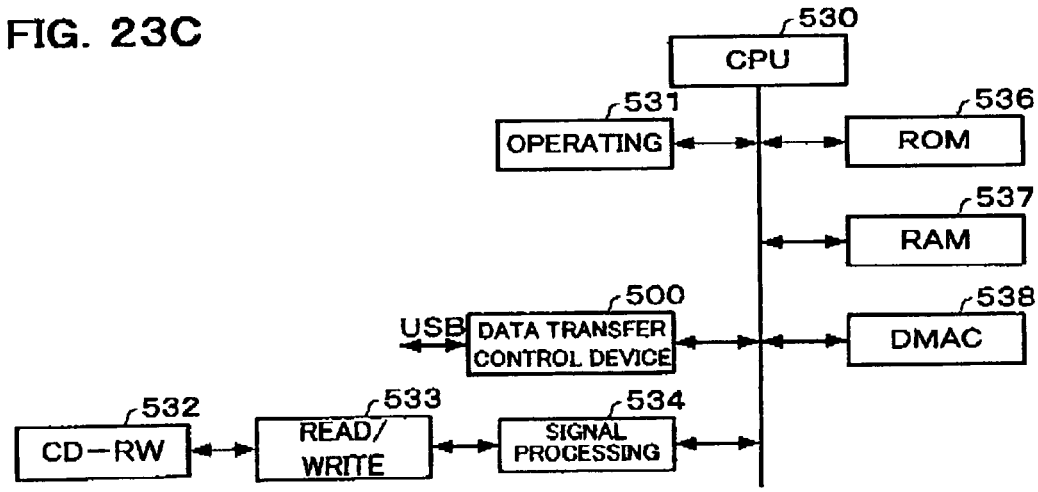
Figure 24C:
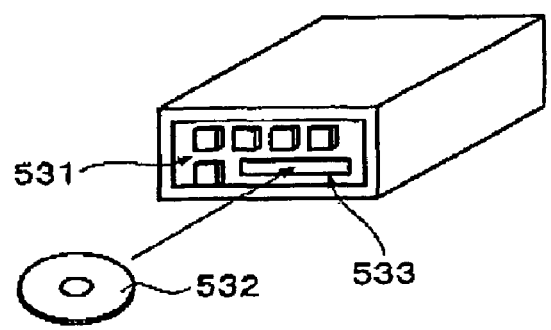

An internal block diagram of a CD ɹRW drive that is a further example of electronic equipment is shown in FIG. 23C with an external view thereof being shown in FIG. 24C. A CPU 530 has various functions, including that of controlling the entire system. An operating section 531 is designed to enable the user to operate the CD ɹRW drive. Data such as a control program is stored in a ROM 536, and a RAM 537 functions as a work area for the CPU 530. A DMAC 538 is a DMA controller.

Data read out from a CD ɹRW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device such as a personal computer via USB.

Serial data that comes in from another device via USB, on the other hand, is converted into parallel data by the data transfer control device 500. This parallel data is sent to the signal processing section 534 by the CPU 530 or the DMAC 538. This parallel print data is subjected to given signal processing by the signal processing section 534 then is stored by the read/write section 533 on the CD ɹRW 532.

Note that a separate CPU for controlling data transfer by the data transfer control device 500 could be provided in addition to the CPU 510, 520, or 530 of FIGS. 23A, 23B, and 23C.

Use of the data transfer control device of this embodiment of the present invention in electronic equipment makes it possible to transfer data in the HS mode laid down by USB 2.0. When a user uses a personal computer or the like to specify a printout, it is therefore possible to complete printing with only a small time lag. In addition, the user can view an image that is read in with only a small time lag after a scanner has been instructed to fetch the image. It also makes it possible to read data from a CD-RW and write data to a CD-RW at high speed.

Use of the data transfer control device of this embodiment in electronic equipment makes it possible to manufacture a data transfer control device that enables data transfer in HS mode, even with ordinary semiconductor processing with inexpensive fabrication costs. It is therefore possible to reduce the cost of the data transfer control device and thus reduce the cost of the electronic equipment. In addition, it is possible to increase the reliability of data transfer, thus increasing the reliability of the electronic equipment.

Use of the data transfer control device of this embodiment in electronic equipment reduces the processing load on the firmware operating on the CPU, thus making it possible to use an inexpensive CPU. Furthermore, since it is possible to reduce the cost and the scale of the data transfer control device, it is possible to aim for a reduction in the cost and scale of the electronic equipment.

Note that the electronic equipment that can employ a data transfer control device in accordance with the present invention is not limited to the above described embodiment, and thus various other examples can be considered, such as various types of optical disk drive (CD ROM or DVD). magneto-optical (MO) disk drives, hard disk drives, TVs, VCRs, video cameras, audio equipment, telephones, projectors, personal computers, electronic organizers, and dedicated word processors.

Note also that the present invention is not limited to the embodiment described herein, and various modifications are possible within the scope of the invention as laid out hereunder.

For example, the configuration of the data transfer control device in accordance with the present invention is not limited to that shown in FIGS. 12, 13, and 14, and thus various modifications thereof are possible.

In addition, this embodiment was described with reference to a case in which the first storage area was the EP2 area (data storage area) and the second storage area was the CSW area (status storage area), but the present invention is not limited thereto. In other words, the information stored in the first and second storage areas can be of any type. Furthermore, three or more informations could be set to the end points, and the types of information can be freely selected.

This embodiment has been described with reference to an example in which the present invention was applied to the USB Bulk-Only specification, but the application of the present invention is not limited to the USB Bulk-Only specification.

In addition, the method of switching between the first and second storage areas is not limited to the method described in detail with reference to FIGS. 7A to 22B, and thus various modifications thereof are possible.

In addition, it is particularly desirable to apply the present invention to data transfer under USB 2.0, but the present invention is not limited thereto. For example, the present invention can also be applied to data transfer in accordance with a standard that is based on a concept similar to that of USB 2.0, or a standard that is developed from USB 2.0.

What is claimed is:

1. A data transfer control device for data transfer through a bus, comprising:
    a buffer which includes a first storage area for a first information and a second storage area for a second information, the first and second storage areas being provided for one end point, when a plurality of types of informations including the first and second informations have been allocated as informations to be transferred through the one end point; and
    a buffer management circuit which reads information to be transferred from the end point to a host from the first storage area for the first information during a first phase in which the first information is transferred through the bus, and reads information to be transferred from the end point to the host from the second storage area for the second information during a second phase in which the second information is transferred through the bus,
    wherein the first information is a data packet;
    wherein the second information is a status block packet;
    wherein the second storage area comprises a third storage area into which is written a first status block packet for success status and a fourth storage area into which is written a second status block packet for non-success status; and
    wherein the first status block packet for success status is read from the third storage area when status is success, and the second status block packet for non-success status is read from the fourth storage area when status is non-success.

2. Electronic equipment comprising:
    the data transfer control device as defined by claim 1; and
    a device which performs output processing, fetch processing, or storage processing on data transferred through the data transfer control device and the bus.

3. A data transfer control device for data transfer through a bus, comprising:
    a buffer which includes a first storage area for a first information and a second storage area for a second information, the first and second storage areas being provided for one end point, when a plurality of types of informations including the first and second informations have been allocated as informations to be transferred through the one end point; and
    a buffer management circuit which reads information to be transferred from the end point to a host from the first storage area for the first information during a first phase in which the first information is transferred through the bus, and reads information to be transferred from the end point to the host from the second storage area for the second information during a second phase in which the second information is transferred through the bus,
    wherein the first information is a data packet;
    wherein the second information is a status block packet;
    wherein the second storage area comprises a third storage area into which is written a first status block packet for success status and a fourth storage area into which is written a second status block packet for non-success status;
    wherein the first status block packet for success status is read from the third storage area when status is success, and the second status block packet for non-success status is read from the fourth storage area when status is non-success; and
    wherein a status block packet in which is set default information for success status is written beforehand into the third storage area.

4. A data transfer control device for data transfer through a bus, comprising:
    a buffer which includes a first storage area for a first information and a second storage area for a second information, the first and second storage areas being provided for one end point, when a plurality of types of informations including the first and second informations have been allocated as informations to be transferred through the one end point; and
    a buffer management circuit which reads information to be transferred from the end point to a host from the first storage area for the first information during a first phase in which the first information is transferred through the bus, and reads information to be transferred from the end point to the host from the second storage area for the second information during a second phase in which the second information is transferred through the bus,
    wherein the first information is a data packet;
    wherein the second information is a status block packet;

wherein the second storage area comprises a third storage area into which is written a first status block packet for success status and a fourth storage area into which is written a second status block packet for non-success status;

wherein the first status block packet for success status is read from the third storage area when status is success, and the second status block packet for non-success status is read from the fourth storage area when status is non-success;

wherein a status block packet in which is set default information for success status is written beforehand into the third storage area; and wherein tag information for linking together a status block packet and a command block packet is updated, from among information for the status block packet in which default information is set, and the updated status block packet is read as the first status block packet from the third storage area.

5. A data transfer control device for data transfer through a bus, comprising:

a buffer which includes a first storage area for a first information and a second storage area for a second information, the first and second storage areas being provided for one end point, when a plurality of types of informations including the first and second informations have been allocated as informations to be transferred through the one end point; and a buffer management circuit which reads information to be transferred from the end point to a host from the first storage area for the first information during a first phase in which the first information is transferred through the bus, and reads information to be transferred from the end point to the host from the second storage area for the second information during a second phase in which the second information is transferred through the bus, wherein a read area for information to be transferred from an end point to a host is switched from the first storage area to the second storage area, when it has been determined that a phase has switched from the first phase to the second phase; and wherein it is determined that a phase has switched from the first phase to the second phase when the condition is satisfied that transfer processing for transferring the first information through a second bus and writing the information into the first storage area has completed and also that the first storage area has become empty.

6. Electronic equipment comprising:

the data transfer control device as defined by claim 5; and a device which performs output processing, fetch processing, or storage processing on data transferred through the data transfer control device and the bus.

* * * * *